(12) United States Patent
Sugawara et al.

(10) Patent No.: US 7,968,180 B2
(45) Date of Patent: *Jun. 28, 2011

(54) EXTRUDED PROPYLENE-RESIN COMPOSITE FOAM

(75) Inventors: Minoru Sugawara, Ichihara (JP); Yasuhiko Otsuki, Ichihara (JP); Motoki Yamada, Ichihara (JP); Ryoichi Tsunori, Ichihara (JP)

(73) Assignee: Prime Polymer Co., Ltd., Tokyo (JP)

( * ) Notice: Subject to any disclaimer, the term of this patent is extended or adjusted under 35 U.S.C. 154(b) by 665 days.

This patent is subject to a terminal disclaimer.

(21) Appl. No.: 11/912,955

(22) PCT Filed: Apr. 26, 2006

(86) PCT No.: PCT/JP2006/308773
§ 371 (c)(1),
(2), (4) Date: Oct. 29, 2007

(87) PCT Pub. No.: WO2006/118160
PCT Pub. Date: Nov. 9, 2006

(65) Prior Publication Data
US 2009/0076179 A1    Mar. 19, 2009

(30) Foreign Application Priority Data

Apr. 27, 2005    (JP) ............................. 2005-130196
Apr. 27, 2005    (JP) ............................. 2005-130197
Apr. 27, 2005    (JP) ............................. 2005-130198

(51) Int. Cl.
B32B 3/26        (2006.01)
C08L 23/10       (2006.01)

(52) U.S. Cl. .................. 428/316.6; 428/317.9; 525/240

(58) Field of Classification Search ............. 428/316.6, 428/317.9; 521/181, 79; 525/240, 243, 245, 525/247
See application file for complete search history.

(56) References Cited

U.S. PATENT DOCUMENTS
6,213,540 B1 * 4/2001 Tusim et al. ............ 296/187.02
(Continued)

FOREIGN PATENT DOCUMENTS
JP    53-1262    1/1978
(Continued)

OTHER PUBLICATIONS

Kawata Mfg Co,. Ltd., Urethane Foam-RIM Machine, MCF (Micro Cellular Foam)—RIM, Catalogue No. 3N-03, 2 pages (with English translation).

(Continued)

*Primary Examiner* — Hai Vo
(74) *Attorney, Agent, or Firm* — Oblon, Spivak, McClelland, Maier & Neustadt, L.L.P.

(57) ABSTRACT

The extruded propylene-based resin composite foam (1) according to the present invention is provided by extrusion-foaming a molding material containing a propylene-based resin. The propylene-based resin forming the extruded foam has an olefin-based polymer whose loss tangent (tan δ) is 0.04 to 100 at a temperature of 298 K and a frequency of 10 Hz. The molding material includes a fibrous filler in an amount of more than 0 mass % and 60 mass % or less of the entirety of the molding material. The extruded composite foam (1) includes: first extruded foam (2) whose closed cell content is 40 percent or more and whose expansion ratio is 10 or more; and second extruded foam (3) whose closed cell content is less than 40 percent and whose expansion ratio is 10 or more.

19 Claims, 13 Drawing Sheets

U.S. PATENT DOCUMENTS

| | | | |
|---|---|---|---|
| 6,432,512 B1 * | 8/2002 | Brandolini | 428/159 |
| 6,844,055 B1 * | 1/2005 | Grinshpun et al. | 428/304.4 |
| 7,018,700 B2 * | 3/2006 | Park | 428/131 |
| 7,732,532 B2 * | 6/2010 | Tsunori et al. | 525/240 |
| 2007/0037914 A1 * | 2/2007 | Heck et al. | 524/451 |

FOREIGN PATENT DOCUMENTS

| | | |
|---|---|---|
| JP | 7-76052 | 3/1995 |
| JP | 9-25354 | 1/1997 |
| JP | 10-195219 | 7/1998 |
| JP | 10-279632 | 10/1998 |
| JP | 2000-309670 | 11/2000 |
| JP | 2000-336198 | 12/2000 |
| JP | 2001-47537 | 2/2001 |
| JP | 2001-80008 | 3/2001 |
| JP | 3255697 | 11/2001 |
| JP | 2002-12717 | 1/2002 |
| JP | 2002-509575 | 3/2002 |
| JP | 2002-105256 | 4/2002 |
| JP | 2002-524635 | 8/2002 |
| JP | 2002-524636 | 8/2002 |
| JP | 2002-542360 | 12/2002 |
| JP | 2003-528173 | 9/2003 |
| JP | 2004-237729 | 8/2004 |
| WO | WO 01/70861 A2 | 9/2001 |
| WO | WO 03/070788 A1 | 8/2003 |
| WO | WO 03/070790 A1 | 8/2003 |
| WO | WO 2005097842 A1 * | 10/2005 |

OTHER PUBLICATIONS

Toshimasa Ota, et al., "Processing and cell nucleation control for low density polypropylene foam by using of a MCF-EXT system", 3 pages (with English Abstract).

* cited by examiner

200 μm

US 7,968,180 B2

EXTRUDED PROPYLENE-RESIN COMPOSITE FOAM

TECHNICAL FIELD

The present invention relates to extruded propylene-based resin composite foam that includes first extruded foam having an excellent insulation efficiency and second extruded foam having an excellent sound absorption performance, the extruded composite foam having a vibration-suppressive performance and an energy-absorbing capability.

BACKGROUND OF THE INVENTION

Extruded foam molded by extrusion-foaming a thermoplastic resin and an assembly of bundled threads of the extruded foam molded by a so-called strand-extrusion involving the steps of extruding the thermoplastic resin from dies having a large number of small pores; bundling extruded resin threads together; and fusing and foaming the surfaces thereof are excellent in mechanical properties even though light in weight. Therefore, the foam is broadly applied as structural materials in various fields, such as the fields of building construction, civil engineering and the fields of automobiles. In particular, the foam is expected to be employed as a structural material having an insulation efficiency and a sound absorption performance. As such extruded foam of a thermoplastic resin, extruded foam formed of a polystyrene-based resin is known. In addition, as extruded foam of a thermosetting resin, extruded foam formed of a polyurethane-based resin is known.

However, a polyurethane resin and a polystyrene resin are materials that are not always excellent in recycling characteristics, and there is a problem that when these resins are used, it is difficult to sufficiently comply with the construction waste recycling law (law on recycling of materials for construction works, etc.). In addition, the polystyrene resin has poor heat resistance and chemical resistance. Therefore, extruded foam made of a thermoplastic resin that is alternative to those resins has been demanded.

On the other hand, a polypropylene-based resin, which is excellent in mechanical property, heat-resisting property, chemical resistance, electrical property and the like, is also a low cost material, so that it is widely used in various molding fields. Thus, extruded foam of the polypropylene-based resin is also expected to have high industrial utility. In recent years, the extruded foam of the polypropylene-based resin has been expected to be an insulating material and a sound absorption material, and there have been a variety of studies conducted (e.g., Patent Document 1 and Patent Document 2).

Furthermore, in fields such as building construction, civil engineering or automobiles, there has been a need that the extruded foam has a vibration suppressive performance and a high shock-absorbing capability (energy-absorbing capability) in addition to the insulation efficiency and the sound absorption performance. For instance, the extruded foam, if applicable to a vibrating substrate surface such as a door panel, a fender panel, a ceiling panel, a trunk-lid etc., of an automobile, can also favorably reduce a weight of the automobile. For the extruded foam to be used in the ceiling, the door and the like of the automobile, the extruded foam is required to have a capability of absorbing a shock energy caused in an automobile collision and the like as well as a high sound absorption performance.

[Patent Document 1] JP-T-2002-524635
[Patent Document 2] JP-T-2003-528173

DISCLOSURE OF THE INVENTION

Problems to be Solved by the Invention

However, although some pieces of the conventional extruded foam has either one of the insulation efficiency or the sound absorption performance, a few pieces of the conventional extruded foam has both of the properties. Even if the conventional extruded foam has both the properties, the properties are not necessarily good. In addition, since a sound absorption performance and a shock-energy-absorbing capability of extruded propylene-based resin foam obtained by these methods have not been good, there has been a demand for an improvement.

Accordingly, a first object of the present invention is to provide extruded propylene-based resin composite foam having an insulation efficiency and a sound absorption performance, a second object of the present invention is to provide extruded propylene-based resin composite foam having the insulation efficiency, the sound absorption performance and a vibration suppressive performance, a third object of the present invention is to provide extruded propylene-based resin composite foam having the insulation efficiency, the sound absorption performance and an energy-absorbing capability, and a fourth object of the present invention is to provide extruded propylene-based resin composite foam having the insulation efficiency, the sound absorption performance, the vibration suppressive performance and the energy-absorbing capability.

Means for Solving the Problems

In order to achieve the above-described objects, extruded propylene-based resin composite foam according to an aspect of the present invention is extruded propylene-based resin composite foam that is formed by extrusion-foaming a molding material including a propylene-based resin, the extruded propylene-based resin composite foam including: first extruded foam having a closed cell content of 40 percent or more and an expansion ratio of 10 or more; and second extruded foam having a closed cell content of less than 40 percent and an expansion ratio of 10 or more.

The extruded propylene-based resin composite foam according to the aspect of the present invention is formed by extrusion-foaming the propylene-based resin. The extruded composite foam includes the first extruded foam and the second extruded foam that respectively have a different arrangement.

Since the first extruded foam has the closed cell content of 40 percent or more and the expansion rate of 10 or more, the multiple closed cells prevent heat from being conducted, such that the extruded foam excellent in the insulation efficiency is provided. In addition, the extruded foam is also excellent in a mechanical strength such as an impact strength and a moisture resistance.

In addition, since the second extruded foam has the closed cell content of less than 40 percent, an open cell structure in which a gas phase continuously connecting the cells is formed is provided to the second extruded foam as desired. The second extruded foam has the expansion ratio of 10 or more, such that a content of the gas phase in the foam is increased, thereby providing the extruded foam that is excellent in the sound absorption performance.

Since the extruded propylene-based resin composite foam according to the aspect of the present invention includes the first extruded foam and the second extruded foam as arranged above, the extruded composite foam that is excellent in the insulation efficiency and the sound absorption performance is provided.

Incidentally, the extruded composite foam according to the present invention has the expansion ratio of 10 or more, such that the weight of the foam is reduced, thereby improving usability.

Since the propylene-based resin as the material is excellent in a recycling performance, a chemical resistance, a heat-resistance and the like, the extruded propylene-based resin composite foam according to the present invention also has these properties (the recycling performance, the heat-resisting property, the chemical resistance and the like). By using the propylene-based resin, which is a low cost material, the extruded composite foam having the above-described effects can be provided at low cost.

In the extruded propylene-based resin composite foam, it is preferable that the extruded propylene-based resin composite foam is a laminate in which the first extruded foam and the second extruded foam are laminated in a thickness direction of the extruded composite foam.

According to the aspect of the present invention, since the extruded composite foam is arranged to be a laminate in which the first extruded foam and the second extruded foam are laminated in the thickness direction of the extruded composite foam, the two types of the extruded foam with the different capabilities can be efficiently arranged, thereby reliably providing the above-described effects. By arranging the first extruded foam to have an epidermal layer (skin layer) on a surface layer, the first extruded foam becomes excellent in a sound insulation.

In providing the extruded composite resin by the first extruded foam and the second extruded foam, structural arrangements of the first and second extruded foam may be determined as desired in accordance with a usage and the like. For instance, the first and second extruded foam may not have to form a lamination layer on the entire extruded composite foam. Either of the first or second extruded foam may form a primary portion of the extruded composite foam while the other of the first or second extruded foam may be dispersed on the extruded composite foam.

In such an arrangement, the dispersion of the other extruded foam may be adjusted to adjust a balance between the shock absorbency and the sound absorption property provided by both the extruded foam, such that the extruded composite foam can be provided to have capabilities as desired.

While the other extruded foam may be dispersed on the entirety of one extruded foam forming the primary portion, the other extruded foam may be unevenly distributed to a specific portion in the thickness direction or a surface direction of the extruded composite foam.

For example, when the second extruded foam having the sound absorption performance is dispersed as the other extruded foam, it is preferable that the second extruded foam is dispersed to be exposed on the surface (at least either of the surfaces) of the extruded composite foam.

By concentrating the second extruded foam on a specific portion of the surface of the extruded composite foam, the specific portion of the extruded composite foam may exhibit a local effect, thereby appropriately meeting a need to locally provide the shock-absorbing property or the sound absorption property to the specific portion.

In the extruded propylene-based resin composite foam according to the aspect of the present invention, it is preferable that the closed cell content of the first extruded foam is 60 percent or more.

According to the aspect of the present invention, since the first extruded resin of the extruded propylene-based resin composite foam has the closed cell content of 60 percent or more, the multiple closed cells prevent heat from being conducted. Accordingly, the insulation efficiency is further enhanced and the mechanical strength such as impact strength and the humidity resistance are also enhanced. The closed cell content of the first extruded foam is preferably 70 percent or more.

In the extruded propylene-based resin composite foam according to the aspect of the present invention, it is preferable that an average diameter of foam cells forming the first extruded foam is 500 μm or less.

According to the aspect of the present invention, since the average diameter of the foam cell that forms the first extruded foam of the extruded propylene-based resin composite foam is 500 μm or less, a multiple of cell walls can be formed in the extruded foam, thereby realizing an efficient shielding of radiant heat from the outside. Consequently, the extruded composite foam can be more excellent in the insulation efficiency.

Incidentally, the average diameter of the foam cell forming the first extruded foam is preferably 200 μm or less, thereby further efficiently improving the above-described effects.

In the extruded propylene-based resin composite foam according to the aspect of the present invention, it is preferable that an average diameter of foam cells forming the second extruded foam is in a range of 0.005 to 5.0 mm.

According to the aspect of the present invention, since the average diameter of the foam cell forming the second extruded foam of the extruded propylene-based resin composite foam is 0.005 to 5.0 mm, the number of cell walls can be increased in the extruded foam as compared with general extruded propylene-based resin foam. With this arrangement, viscous dissipation of sound vibration energy is efficiently performed by air viscous friction on the cell walls, whereby the sound absorption property of the extruded foam can be improved.

In the extruded propylene-based resin composite foam, it is preferable that a propylene-based multistage polymer including the following constituents (A) and (B) is used as the propylene-based resin to form at least either one of the first extruded foam or the second extruded foam:

(A) a constituent containing a propylene homopolymer component or a copolymer component of propylene and α-olefin having carbon number of 2 to 8, each having an intrinsic viscosity [η] of more than 10 dL/g, which is measured in a tetralin solvent at 135° C., the component occupying 5 to 20 mass % of the total polymer; and (B) a constituent containing a propylene homopolymer component or a copolymer component of propylene and α-olefin having carbon number of 2 to 8, each having an intrinsic viscosity [η] of 0.5 to 3.0 dL/g, which is measured in a tetralin solvent at 135° C., the component occupying 80 to 95 mass % of the total polymer.

The extruded propylene-based resin composite foam according to the aspect of the present invention is formed of a linear propylene-based polymer having a high melt tension and an excellent viscoelastic property. The high melt tension is obtained by adding to the linear propylene-based polymer the constituent (A) that is an ultrahigh-molecular-weight propylene based polymer while the excellent viscoelastic property is obtained by controlling a molecular weight distribution to adjust the viscoelastic property. Accordingly, by using the propylene-based multistage polymer having the excellent viscoelastic property as the material, the extruded propylene-based resin composite foam having the expansion ratio of 10 or more can be reliably provided.

In the extruded propylene-based resin composite foam according to the aspect of the present invention, it is preferable that a relationship between a melt flow rate (MFR) at 230° C. and the melt tension (MT) at 230° C. of he propylene-based multistage polymer satisfies the following expression (III).

$$\log(MT) > -1.33 \log(MFR) + 1.2 \quad (III)$$

According to the aspect of the present invention, the relationship between the melt flow rate (MFR) at 230° C. and the melt tension (MT) at 230° C. of the propylene-based multistage polymer satisfies the expression (III), thereby facilitating a molding of the foam having the high expansion ratio. With this arrangement, the extruded composite foam having the expansion ratio of 10 or more can be easily and reliably obtained.

The extruded propylene-based resin composite foam according to the aspect of the present invention is preferably an assembly of bundled threads of extruded foam, in which a plurality of extrusion-foamed threads are bundled.

According to the aspect of the present invention, since the extruded propylene-based resin composite foam is the assembly of bundled thread of extruded foam in which the plurality of extrusion-foamed threads are bundled, the extruded composite foam can have a high expansion ratio, thereby facilitating a molding of the extruded composite foam having the high expansion ratio and a sufficient thickness in various shapes.

In the extruded propylene-based resin composite foam according to the aspect of the present invention, it is preferable that the second extruded foam includes a portion in which none of the threads is present.

According to the aspect of the present invention, a space provided by the portion in which none of the threads are present can effectively absorb acoustic waves within a specific frequency range, thereby further improving the sound absorption performance. Specifically, the frequency of the absorbed acoustic wave depends on an arrangement of the above-described space. When a frequency of a to-be-absorbed noise and the like is specified, the arrangement of the above-described space may be determined as desired in accordance with the specified frequency, thereby realizing an efficient sound absorption performance.

In the extruded propylene-based resin composite foam according to the aspect of the present invention, it is preferable that at least a part of a surface of the second extruded foam communicates with an outside air.

According to the aspect of the present invention, since a space provided by an open cell structure inside the foam communicates with the outside air, the space inside the foam can efficiently absorb an acoustic wave from the outside, thereby enhancing the sound absorption performance.

In the extruded propylene-based resin composite foam according to the aspect of the present invention, it is preferable that in at least one of the first extruded foam and the second extruded foam, the propylene-based resin forming the extruded foam contains an olefin-based polymer whose loss tangent (tan δ) is 0.04 to 100 at a temperature of 298 K and a frequency of 10 Hz.

In the extruded propylene-based resin composite foam according to the aspect of the present invention, the olefin-based polymer (hereinafter, may be referred to as "specific olefin-based polymer") whose loss tangent (tan δ) at the temperature of 298K and the frequency of 10 Hz is 0.04 to 100 or less is added to the propylene-based resin as the molding material, such that at least one of the first extruded foam and the second extruded foam contains the olefin-based polymer.

Since the specific olefin-based polymer is not bonded with the propylene-based resin as the molding material, the olefin-based polymer is excluded from a crystal of polypropylene (a crystal polymer). Consequently, the specific olefin-based polymer, which is a viscous material, is uniformly dispersed on a surface of the foam cells of the extruded foam (i.e., the first extruded foam and the second extruded foam).

Specifically, while the propylene-based resin, which is a rigid part, transmits an energy, a material that is viscous around room temperature (specific olefin-based polymer) absorbs a vibration energy since the material uses the vibration energy as a thermal energy for an inner molecular movement. In addition, it is preferable to uniformly disperse the viscous material on a vibration surface for a vibration absorption. The specific olefin-based polymer, which has a molecular structure similar to that of the polypropylene-based resin (the vibration surface), is compatible with the polypropylene-based resin to some extent. Thus, the specific olefin-based polymer is uniformly dispersed on surfaces of cell walls to efficiently absorb the vibration, whereby the extruded composite foam that is excellent in the vibration-suppressive performance is provided.

As described above, according to the present invention, the extruded propylene-based resin composite foam having the vibration-suppressive performance in addition to the insulation efficiency and the sound absorption performance can be favorably provided.

In the extruded propylene-based resin composite foam according to the aspect of the present invention, it is preferable that a weight ratio (a/b) of the olefin-based polymer (a) to the propylene-based resin (b) is in a range of 1/100 to 80/100.

According to the aspect of the present invention, since the molding material contains the olefin-based polymer at the weight ratio (a/b) of 1/100 to 80/100, the olefin-based polymer is appropriately dispersed on the wall surfaces of the foam cells in the molded foam formed of the polypropylene-based resin, thereby enhancing the vibration suppressive performance.

In the extruded propylene-based resin composite foam according to the aspect of the present invention, it is preferable that as the olefin-based polymer, a 1-butene-based copolymer of the following first mode or a 1-butene-based copolymer of the following second mode is used. By using such a 1-butene-based polymer, the extruded composite foam can reliably have the vibration-suppressive performance.

The first mode: a 1-butene-based polymer that satisfies the following conditions (1) to (3):
(1) an intrinsic viscosity [η] measured in a tetralin solvent at 135° C. is in a range of 0.01 to 0.5 dL/g;
(2) the polymer is a crystalline resin whose melting point ($T_m$-D) is 0 to 100° C., the melting point being defined as the top of peak observed using a differential scanning calorimeter (DSC) at a highest temperature side of a melting endothermic curve, the melting endothermic curve being obtained by heating up at a rate of 10° C./min after keeping a sample at −10° C. under nitrogen atmosphere for 5 minutes; and
(3) a stereoregularity index {(mmmm)/(mmrr+rmmr)} of the polymer is 30 or less.

The second mode: a 1-butene-based polymer that satisfies the following conditions (1'), (2) and (3'):

(1') an intrinsic viscosity [η] of the polymer measured in a tetralin solvent at 135° C. is 0.25 to 0.5 dL/g;

(2) the polymer is a crystalline resin whose melting point ($T_m$-D) is 0 to 100° C., the melting point being defined as the top of peak observed using a differential scanning calorimeter (DSC) at a highest temperature side of a melting endothermic curve, the melting endothermic curve being obtained by heating up at a rate of 10° C./min after keeping a sample at −10° C. under nitrogen atmosphere for 5 minutes; and (3') a mesopentad fraction (mmmm) of the polymer obtained from a $^{13}$C-nuclear magnetic resonance (NMR) spectrum is 73 percent or less.

In the extruded propylene-based resin composite foam according to the aspect of the present invention, it is preferable that at least one of the first extruded foam and the second extruded foam contains a fibrous filler at an amount of more than 0 mass percent and 60 mass percent or less of an entirety of the extruded foam in the molding material.

In the extruded propylene-based resin composite foam according to the aspect of the present invention, at least one of the first extruded foam and the second extruded foam contains a fibrous filler at an amount of more than 0 mass percent and 60 mass percent or less of an entirety of the extruded foam in the molding material. The fibrous filler is disposed at random due to the foam cells in the extruded propylene-based resin foam. With this arrangement, a fiber length direction of the fibrous filler is aligned along an extruding direction of the extruded propylene-based resin foam. In addition, the fiber length direction of the fibrous filer is aligned along a thickness direction of the extruded foam due to the foam cells. Accordingly, even when a small strain is caused in the thickness direction of the extruded propylene-based resin foam, a large stress is generated, thereby improving the energy-absorbing capability.

The content of the fibrous filler is preferably more than 0 mass % and 60 mass % or less of the entirety of the molding material, more preferably within a range of 5 to 30 mass %. When the content of the fibrous filler is less than 5 mass %, the energy-absorbing capability is not sufficiently improved. When the content of the fibrous filler is more than 30 mass %, not only the foam moldability may be impaired but also the fibrous filler may protrude from the wall surfaces of the foam cells. In the latter case, the fibrous filler may excessively break the cell structure to reduce the expansion ratio.

When the content of the fibrous filler is more than 60 mass %, the foam moldability is degraded and the fibrous filler prominently protrudes from the wall surfaces of the foam cells to reduce the expansion ratio.

In the extruded propylene-based resin composite foam according to the aspect of the present invention, it is preferable that 20 percent or more of total fibers of the fibrous filler are oriented in a thickness direction that is substantially perpendicular to an extruding direction of the extruded propylene-based resin composite foam.

According to the aspect of the present invention, since 20 percent or more of the fibrous filler is oriented along the thickness direction of the extruded propylene-based foam, the extruded propylene-based composite foam having a high energy-absorbing capability is provided.

Incidentally, in the present invention, the fibrous filler arranged in the thickness direction means that an angle at which the fiber length direction is arranged to the axis of the thickness direction is in a range of 0 (parallel to the thickness direction) to 45 degrees.

BRIEF DESCRIPTION OF THE DRAWING(S)

EXPLANATION OF CODES

Figure 1:
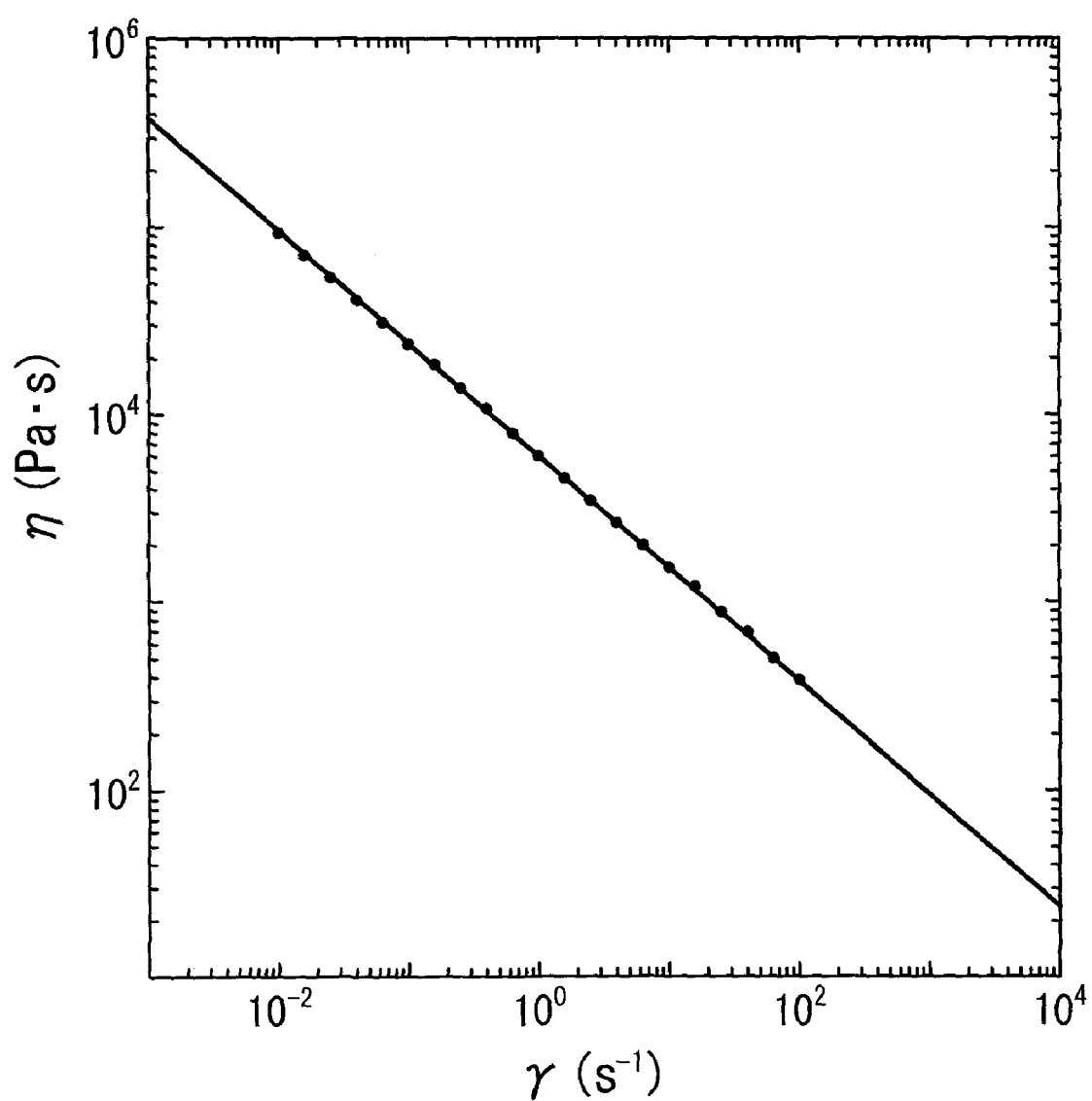
FIG. 1 is a graph showing a relationship between a shear rate (γ) and a shear viscosity ($η_M$)

1: extruded propylene-based resin composite foam (assembly of bundled threads of extruded foam 1)
2: first extruded foam
3: second extruded foam
21, 31: foam cell
22, 32: thread
23, 33: epidermal layer
34: no-thread portion
5, 6: extrusion die
51, 61: extrusion orifice
7: cooling sizing roller
71: cooling roller
8: belt
81: acicular body
9: fibrous filler

BEST MODE FOR CARRYING OUT THE INVENTION

Although embodiments of the present invention will be described below, the below-described embodiments are merely exemplary embodiments of the present invention and do not limit the present invention. Modifications and improvements are included in a scope of the present invention as long as the arrangements of the present invention are included and an object and advantages can be achieved. In addition, specific arrangements and profiles when implementing the present invention may be altered as long as an object and an advantage of the present invention can be achieved.

First Embodiment

Extruded propylene-based resin composite foam and a producing method of the extruded propylene-based resin composite foam according to a first embodiment of the present invention will be described below.

The extruded propylene-based resin composite foam according to the present embodiment (hereinafter, may be referred to as "extruded composite foam") is provided by extrusion-foaming a propylene-based resin to include: first extruded foam whose closed cell content is 40 percent or more and whose expansion ratio is 10 or more; and second extruded foam whose closed cell content is less than 40 percent and whose expansion ratio is 10 or more. With this arrangement, the extruded composite foam may have an insulation efficiency and a sound absorption performance with a light weight.

For the reasons described below, the extruded composite foam according to the present invention has the insulation efficiency and the sound absorption performance.

The insulation efficiency of the extruded foam having a certain degree of an expansion ratio (e.g. 10 or more) depends on the expansion ratio and the closed cell content. Specifically, the higher the expansion ratio becomes, the more a content of air, which is excellent in insulation efficiency, becomes. Thus, the extruded composite foam having a higher expansion ratio has a better insulation efficiency. When the closed cell content is high, the multiple closed cells prevent heat from being conducted, thereby providing the extruded foam that is excellent in the insulation efficiency. In the extruded composite foam according to the present embodiment, since the first extruded foam has the expansion ratio of 10 or more and the closed cell content of 40 percent or more, the multiple closed cells prevent heat from being conducted, thereby providing the extruded foam that is excellent in the insulation efficiency. In addition, the extruded foam is also excellent in a mechanical strength such as an impact strength and a moisture resistance. The closed cell content of the first extruded foam is more preferably 70 percent or more.

The insulation efficiency of the extruded foam also depends on an average diameter of the foam cell forming the foam (average cell diameter) under the above-described condition. Specifically, when the average diameter is reduced while the same expansion ratio is maintained, the number of a cell wall that shields radiant heat is increased to prevent heat from being conducted, thereby improving the insulation efficiency. Thus, the average diameter of the foam cell (average cell diameter) is preferably small. In the extruded composite foam according to the present embodiment, since the average diameter of the foam cell that forms the first extruded foam is 500 μm or less, a multiple of cell walls can be formed in the extruded foam, thereby realizing an efficient shielding of the radiant heat from the outside.

The average diameter of the foam cell forming the first extruded foam is more preferably 200 μm or less.

The sound absorption performance of the extruded foam depends on an open cell structure and the expansion ratio of the extruded foam. Specifically, when the cell is broken to form a continuous gas phase that communicates with the cells in the extruded foam, it is known that the acoustic wave is absorbed via the continuous gas phase, which enhances the sound absorption performance of the extruded foam. Thus, by molding the foam having the open cell structure in which the closed cell content is low, the sound absorption performance of the extruded foam can be enhanced. In addition, since the acoustic wave is absorbed by the gas phase in the foam, the sound absorption performance can be enhanced by increasing a gas phase content (i.e., by increasing the expansion ratio).

On the other hand, since the closed cell content of the second extruded foam is less than 40 percent, the extruded foam has the open cell structure in which broken cells are formed as desired. In addition, with the expansion ratio being 10 or more, each cell of the foam is capable of sound absorption. Accordingly, the extruded composite foam can have an excellent sound absorption performance.

Incidentally, it is preferable that the closed cell content is 20 percent or less and that the expansion ratio is 20 or more.

By setting the average diameter of the foam cell forming the extruded foam to be 0.005 to 5.0 mm in the extruded propylene-based resin composite foam according to the present embodiment, the number of cell walls can be increased in the extruded composite foam. Thus, viscous dissipation of sound vibration energy is efficiently performed by air viscous friction on the cell walls, whereby the sound absorption property of the extruded composite foam can be improved.

The average diameter of the foam cell is more preferably 0.05 to 2.0 mm.

Propylene-Based Resin Forming Extruded Composite Foam:

As the propylene-based resin forming the extruded composite foam according to the present embodiment arranged as described above, any propylene-based resin having high melt tension when melted can be used. For example, any of those disclosed in JP-A-10-279632, JP-A-2000-309670, JP-A-2000-336198, JP-A-2002-12717, JP-T-2002-542360 and JP-T-2002-509575 can be used.

As described above, for obtaining the extruded composite foam according to the present embodiment, it is preferable to increase the melt tension of the resin at the time of melting and to use as the polypropylene-based resin a resin material having excellent viscoelastic property.

As an example of the propylene-based resin having the excellent viscoelastic property as described above, it is advantageous to use as the propylene-based resin forming the foam a propylene-based multistage polymer including constituents (A) and (B) as described below:

(A) a constituent containing a propylene homopolymer component or a copolymer component of propylene and α-olefin having carbon number of 2 to 8, each having an intrinsic viscosity [η] of more than 10 dL/g, which is measured in a tetralin solvent at 135° C., the component occupying 5 to 20 mass % of the total polymer; and (B) a constituent containing a propylene homopolymer component or a copolymer component of propylene and α-olefin having carbon number of 2 to 8, each having an intrinsic viscosity [η] of 0.5 to 3.0 dL/g, which is measured in a tetralin solvent at 135° C., the component occupying 80 to 95 mass % of the total polymer.

The propylene-based multistage polymer is a linear propylene-based polymer having a higher melt tension due to the addition of the constituent (A) that is an ultrahigh-molecular-weight propylene based polymer. Additionally, the multistage polymer has an adjusted viscoelastic property, the viscoelastic property being adjusted by controlling a molecular weight distribution. The use of the propylene-based multistage polymer having the excellent viscoelastic property as the material is preferable because the extruded propylene-based resin foam can reliably meet the requirements of the present embodiment as described above (i.e., the closed cell content of less than 40%, the expansion ratio of 10 or more and the average cell diameter of 0.005 to 5.0 mm).

Although depending on a resin material to be used, the resin "having an excellent viscoelastic property" refers to a resin material that is largely deformed during high-speed deformation in forming the cell one hand and that relaxes a subsequent stress at moderately high speed on the other hand. When the stress is relaxed at low speed, the structure of the extruded foam cannot be maintained after the cells are broken because of a residual stress.

When the constituent (A) has an intrinsic viscosity of 10 dL/g or less, the melt tension becomes insufficient, whereby the desired foaming performance may not be obtained.

In addition, when the mass fraction of the constituent (A) is less than 5 mass %, the melt tension becomes insufficient and the desired foaming performance may not be obtained. In contrast, when the mass fraction exceeds 20 mass %, a so-called melt fracture may intensify, which causes a rough surface and the like of the extruded foam to result in a decrease in product quality.

The intrinsic viscosity of the constituent (A) is preferably more than 10 dL/g as described above, more preferably in the range of 12 to 20 dL/g, and particularly preferably in the range of 13 to 18 dL/g.

In addition, the mass fraction of the constituent (A) is preferably in the range of 8 to 18 mass %, and particularly preferably in the range of 10 to 18 mass %.

The melt tension becomes insufficient when the intrinsic viscosity of the constituent (B) is less than 0.5 dL/g and the desired foaming performance may not be obtained. In contrast, when the intrinsic viscosity exceeds 3.0 dL/g, the viscosity becomes too high and an extrusion molding process may not be performed as desired.

When the mass fraction of the constituent (B) is less than 80 mass %, the extrusion molding process may not be easily performed as desired. When the mass fraction exceeds 95 mass %, the melt tension becomes low and the extrusion molding process may not be easily performed as desired, either.

As descried above, the constituent (B) has a intrinsic viscosity preferably in the range of 0.5 to 3.0 dL/g, more preferably in the range of 0.8 to 2.0 dL/g, and particularly preferably in the range of 1.0 to 1.5 dL/g.

The mass fraction of the constituent (B) is preferably in the range of 82 to 92 mass %, and particularly preferably in the range of 82 to 90 mass %.

In the propylene-based multistage polymer, α-olefin having carbon number of 2 to 8 as a constituent component of the copolymer component may be, for example, α-olefins other than propylene, such as ethylene and 1-butene. Among them, it is preferable to use ethylene.

In addition, the propylene-based multistage polymer has the melt flow rate (MFR) at 230° C. of preferably 100 g/10 min. or less, and particularly preferably 20 g/10 min. or less. When MFR exceeds 100 g/10 min., the melt tension and the viscosity of the multistage polymer become low, the molding may not be easily performed.

In the propylene-based multistage polymer, a relationship between the melt flow rate (MFR) at 230° C. and the melt tension (MT) at 230° C. preferably satisfies the following expression (III).

$$\log(MT) > -1.33 \log(MFR) + 1.2 \quad \text{(III)}$$

When the relationship between the melt flow rate (MFR) at 230° C. and the melt tension (MT) at 230° C. does not satisfy the above expression (III), the molding process of the foam with high expansion ratio may not be easily performed, whereby the extruded foam having the expansion ratio of 10 or more may not be obtained. The constant (1.2) in the expression is preferably 1.3 or more, particularly preferably 1.4 or more.

In order for the relationship to satisfy the expression (III) in the propylene-based multistage polymer, the propylene-based multistage polymer may include 5 to 20 mass % of the constituent (A).

In the propylene-based multistage polymer, it is preferable that as a dynamic viscoelasticity in a molten state (the relationship between angular frequency ω and storage-modulus G'), an inclination of storage modulus at high frequency side is more than a predetermined level. Specifically, the ratio $G'(10)/G'(1)$ of the storage modulus $G'(10)$ at the angular frequency of 10 rad/s to the storage modulus $G'(1)$ at the angular frequency of 1 rad/s is preferably 2.0 or more, and more preferably 2.5 or more. When the ratio $G'(10)/G'(1)$ is smaller than 2.0, the stability of the extruded foam may be impaired when an external deformation such as elongation is applied to the extruded foam.

Similarly, in the propylene-based multistage polymer, it is preferable that as a dynamic viscoelasticity in a molten state, an inclination of the storage modulus at a low frequency side is less than a predetermined level. Specifically, the ratio $G'(0.1)/G'(0.01)$ of the storage modulus $G'(0.1)$ at the angular frequency of 0.1 rad/s to the storage modulus $G'(0.01)$ at the angular frequency of 0.01 rad/s is preferably 6.0 or less, and more preferably 4.0 or less. When the ratio $G'(0.1)/G'(0.01)$ exceeds 6.0, the expansion ratio of the extruded foam may not be easily increased.

The propylene-based multistage polymer can be produced by polymerizing the propylene or copolymerizing propylene with α-olefin having carbon number of 2 to 8 in a polymerization procedure including two or more stages, using olefin-polymerization catalysts including the following components (a) and (b) or the following components (a), (b), and (c):

(a) a solid catalyst component obtained by treating titanium trichloride with an ether compound and an electron acceptor, the titanium trichloride being obtained by reducing titanium tetrachloride with an organic aluminum compound;

(b) an organic aluminum compound; and (c) cyclic ester compound.

In (a) the solid catalyst component obtained by treating the titanium trichloride with the ether compound and the electron acceptor, the titanium trichloride being obtained by reducing the titanium tetrachloride with the organic aluminum compound (hereinafter, also simply referred to as "(a) solid catalyst component"), as the organic aluminum compounds to be used for reducing titanium tetrachloride, there may be used, for example: (i) alkyl aluminum dihalide, specifically methyl aluminum dichloride, ethyl aluminum dichloride, and n-propyl aluminum dichloride; (ii) alkyl aluminum sesquihalide, specifically ethyl aluminum sesquichloride; (iii) dialkyl aluminum halide, specifically dimethyl aluminum chloride, diethyl aluminum chloride, di-n-propyl aluminum chloride, and diethyl aluminum bromide; (iv) trialkyl aluminum, specifically trimethyl aluminum, triethyl aluminum, and tri-isobutyl aluminum; and (v) dialkyl aluminum hydride, specifically diethyl aluminum hydride. Herein, the term "alkyl" refers to lower alkyl such as methyl, ethyl, propyl, or butyl. In addition, the term "halide" refers to chloride or bromide. Particularly, the former is generally used.

The reduction reaction with the organic aluminum compound for obtaining the titanium trichloride is generally performed at a temperature ranging from −60 to 60° C., preferably −30 to 30° C. When the reduction reaction is performed at a temperature of less than −60° C., the reduction reaction will require an extended period of time. In contrast, when the reduction reaction is performed at a temperature of more than 60° C., a partial excessive reduction may unfavorably occur. The reduction reaction is preferably performed under the presence of an inactivated hydrocarbon solvent such as pentane, heptane, octane, and decane.

An ether treatment and an electron acceptor treatment are preferably performed on the titanium trichloride obtained by the reduction reaction of the titanium tetrachloride with the organic aluminum compound.

Examples of ether compounds, which can be preferably used in the ether treatment of the titanium trichloride, include ether compounds in which each hydrocarbon residue is a chain hydrocarbon having carbon number of 2 to 8, such as diethyl ether, di-n-propyl ether, di-n-butyl ether, diisoamyl ether, dineopentyl ether, di-n-hexyl ether, di-n-octyl ether, di-2-ethyl hexyl ether, methyl-n-butyl ether, and ethyl-isobutyl ether. Among them, in particular, use of di-n-butyl ether is preferable.

As the electron acceptors used in the treatment of titanium trichloride, halogenated compounds of elements in groups III to IV and VIII in the periodic table may be preferably used, specifically, titanium tetrachloride, silicon tetrachloride, boron trifluoride, boron trichloride, antimony pentachloride, gallium trichloride, ferric trichloride, tellurium dichloride, tin tetrachloride, phosphorus trichloride, phosphorus pentachloride, vanadium tetrachloride, and zirconium tetrachloride.

In the treatment of titanium trichloride with the ether compound and the electron acceptor in preparation of the solid catalyst component (a), a mixture of both treatment agents may be used, or the treatment with one of these treatment agents may be initially performed to be subsequently followed by the treatment with the other agent. Incidentally, the latter treatment step is more preferable than the former treatment step, and it is particularly preferable to initially perform the ether treatment to be subsequently followed by the treatment with the electron acceptor.

Prior to the treatment with the ether compound and the electron acceptor, the titanium trichloride is preferably washed with hydrocarbon. The above-described ether treatment on titanium trichloride is performed by bringing the titanium trichloride into contact with the ether compound. The treatment of titanium trichloride with the ether compound is advantageously performed by bringing those two into contact with each other in the presence of a diluent. As the diluent, it is preferable to use inactivated hydrocarbon compounds such as hexane, heptane, octane, decane, benzene and toluene. A treatment temperature in the ether treatment is preferably in the range of 0 to 100° C. In addition, although the treatment time is not specifically limited, the treatment is generally performed in the range of twenty minutes to five hours.

The ether compound usage may be generally 0.05 to 3.0 mol per mol of titanium trichloride, preferably 0.5 to 1.5 mol per mol of the titanium trichloride. When the ether compound usage is less than 0.05 mol, stereo regularity of the polymer to be generated may not be sufficiently enhanced as desired. On the other hand, when the ether compound usage exceeds 3.0 mol, yield may be unfavorably decreased although the stereo regularity of the polymer to be generated is enhanced. Strictly speaking, the titanium trichloride having been treated with the organic aluminum compound or the ether compound is a composition mainly containing titanium trichloride.

As the solid catalyst component (a), Solvay-type titanium trichloride may be preferably used.

As the organic aluminum compound (b), the same organic aluminum compound as described above may be used.

As the cyclic ester compound (c), γ-lactone, δ-lactone and ε-lactone and the like may be used, among which ε-lactone is preferable.

The catalyst for olefin polymerization used in the production of the propylene-based multistage polymer can be obtained by mixing the above-described components (a) to (c).

For obtaining the propylene-based multistage polymer, it is preferable to polymerize propylene or copolymerize propylene and α-olefin having carbon number of 2 to 8 in the absence of hydrogen in a two-staged polymerization method. Herein, "in the absence of hydrogen" means "substantially in the absence of hydrogen". Thus, no hydrogen may be present at all or a minute amount of hydrogen may be present (for example, about 10 molppm). In short, the presence of a minute amount of hydrogen can be regarded as "the absence of hydrogen" as long as the intrinsic viscosity [η] of the propylene-based polymer at the first stage or of the propylene-based copolymer at the first stage, which is measured in a tetralin solvent at 135° C., does not become 10 dL/g or less due to the presence of hydrogen.

Propylene is polymerized or copolymerized with α-olefin in the absence of hydrogen as described above to produce a ultrahigh-molecular-weight propylene-based polymer, i.e., the constituent (A) of the propylene-based multistage polymer. The constituent (A) may be preferably produced by slurry-polymerizing a material monomer in the absence of hydrogen under the following conditions: a polymerization temperature is preferably 20 to 80° C., more preferably 40 to 70° C.; and a polymerization pressure is generally an ordinary pressure to 1.47 MPa, preferably 0.39 to 1.18 MPa.

In the producing method, the constituent (B) of the propylene-based multistage polymer may be preferably produced at the second stage or later. Although the production conditions of the constituent (B) is not specifically limited as long as the above-described olefin-based polymer catalyst is used, the constituent (B) may be preferably produced by polymerizing a material monomer in the presence of hydrogen serving as a molecular weight modifier under the following conditions: a polymerization temperature is preferably 20 to 80° C., more preferably 60 to 70° C.; and a polymerization pressure is generally an ordinary pressure to 1.47 MPa, preferably 0.19 to 1.18 MPa.

In the above-described producing method, a preliminary polymerization may be performed before the principal polymerization. A powder morphology may be favorably maintained by performing the preliminary polymerization. In the preliminary polymerization, it is generally preferable to polymerize propylene or to copolymerize the propylene with α-olefin having carbon number of 2 to 8 in an amount of preferably 0.001 to 100 g, more preferably 0.1 to 10 g per gram of solid catalyst component, at a polymerization temperature of preferably 0 to 80° C., more preferably 10 to 60° C.

The propylene-based resin for forming the extruded composite foam may be a propylene-based resin composition that includes: the above-described propylene-based multistage polymer; and the propylene-based polymer with the melt flow rate (MFR) at 230° C. being 30 g/10 min. or less and the ratio $M_w/M_n$ of weight average molecular weight ($M_w$) and a number average molecular weight ($M_n$) being 5.0 or less. The above-described propylene-based multistage polymer may be blended with other materials to provide a resin composition, whereby the moldability of the extruded foam is improved, a functionality of the extruded foam is enhanced, the cost can be reduced and the like.

The use of the resin composition allows the extruded composite foam to have the high melt tension and the excellent viscoelastic property, so that the extruded composite foam can have the high expansion ratio and a good surface appearance and a drawing fracture can be prevented in a sheet forming operation.

In the resin composition, a weight ratio of the propylene-based polymer to the propylene-based multistage polymer is 6 to 1 or more, preferably 10 to 1 or more. If the weight ratio is less than 8 to 1, the surface appearance of the extruded foam composite may be defected.

The melt flow rate (MFR) of the propylene-based polymer is preferably 30 g/10 min. or less, more preferably 15 g/10 min. or less, further preferably 10 g/10 min. or less. When the MFR exceeds 30 g/10 min., the extruded foam may be defectively molded.

The $M_w/M_n$ of the propylene-based polymer is preferably 5.0 or less, more preferably 4.5 or less. If the $M_w/M_n$ exceeds 5.0, the surface appearance of the extruded foam may be degraded.

The propylene-based polymer may be produced by polymerization methods using a known catalyst such as a Ziegler-Natta catalyst or a metallocene catalyst.

As the dynamic viscoelasticity in a molten state (the relationship between the angular frequency ω and the storage-modulus G'), the inclination of storage modulus at high frequency side is preferably equal to or more than a predetermined level while the inclination of the storage modulus at low frequency side is preferably equal to or less than a predetermined level in the resin composition.

Specifically, the ratio G'(10)/G'(1) of the storage modulus G'(10) at the angular frequency of 10 rad/s to the storage modulus G'(1) at the angular frequency of 1 rad/s is preferably 5.0 or more, more preferably 5.5 or more. When the ratio G'(10)/G'(1) is smaller than 5.0, the stability of the extruded foam may be impaired when an external deformation such as elongation is applied to the extruded foam.

The ratio G'(0.1)/G'(0.01) of the storage modulus G'(0.1) at the angular frequency of 0.1 rad/s to the storage modulus G'(0.01) at the angular frequency of 0.01 rad/s is preferably 14.0 or less, more preferably 12.0 or less. When the ratio G'(0.1)/G'(0.01) exceeds 14.0, the expansion ratio of the extruded foam may not be easily increased.

When the extruded foam is drawn, components within a relaxation time of 1 to 10 second(s) generally degrade a drawing property of the extruded foam. The larger a contribution of the relaxation time of this region is, the smaller the inclination of the storage modulus G'(1) becomes at the angular frequency ω of about 1 rad/s. Using the ratio G'(10)/G'(1) of the storage modulus G'(10) at the angular frequency ω of 10 rad/s as an index of the inclination, the results of a numerical simulation and an experimental analysis have proven that the smaller the value is, the more breakable the foam is when drawn in the extrusion-foaming operation. Accordingly, in the above-described resin composition, the ratio G'(10)/G'(1) is preferably 5.0 or more.

For cell breaking at the final stage of the growth of air bubbles or cell breaking caused by high-speed elongational deformation near the die lips in the extrusion foaming operation, a certain degree of strain-hardness property is required. Thus, an appropriate amount of the high molecular weight component is required at an appropriate relaxation time field.

For that purpose, the storage modulus G' at the low-frequency region needs to be large to some extent. Using the ratio G'(0.1)/G'(0.01) of the storage modulus G'(0.1) at the angular frequency ω of 0.1 rad/s to the storage modulus G'(0.01) at the angular frequency of 0.01 rad/s as an index, the results of a numerical simulation and an experimental analysis have proven that the expansion ratio is prominently reduced due to the cell breaking as the value is increased. Accordingly, in the above-described resin composition, the ratio G'(0.1)/G'(0.01) is preferably 14.0 or more.

As long as the effect of the present embodiment is not impaired, the propylene-based resin including the resin composition for forming the extruded foam of the present embodiment may be added with, where necessary: a stabilizer such as an antioxidant, a neutralizer, a crystal-nucleus agent, a metal deactivator, a phosphorus processing stabilizer, a UV absorbent, an UV stabilizer, an optical whitening agent, a metallic soap and an antacid absorbent; and an additive such as a cross-linking agent, a chain transfer agent, a nucleating additive, a lubricant, a plasticizer, a filler, an intensifying agent, a pigment, a dye, a flame retardant, and an antistatic agent. The amounts of those additives may be determined as desired according to the required characteristic features and molding conditions of the extruded foam to be molded.

When the propylene-based multistage polymer having the excellent melting viscoelasticity as described above is used as the propylene-based resin, the above-described additives can be added to the polymer to be melt-kneaded together into a shape of pallet by a conventionally-known melt-kneading machine in advance, and subsequently the desired extruded foam may be molded.

Production of Extruded Propylene-Based Resin Composite Foam:

The extruded foam according to the present embodiment can be obtained by extrusion-foaming the above-described propylene-based resin. A known extrusion foaming device can be used as a production device, which heats the propylene-based resin to be melted, kneads the resin with an appropriate shearing stress applied thereto and extrusion-foams the resin from a tubular die. An extruder included in the production device may be either a uniaxial extruder or a biaxial extruder. As the extrusion foaming device, for example, a tandem-type extrusion foaming device disclosed in JP-A-2004-237729 may be used, to which two extruders are connected.

(2-1) Production of Second Extruded Foam:

In producing the second extruded foam of the extruded propylene-based resin composite foam according to the present embodiment, an open-cell structure is reliably formed while a high expansion ratio is maintained by respectively setting the pressure gradient (k) represented by the following formula (I) and the decompression rate (v) represented by the following formula (II) to be 50 MPa/m≦k≦800 MPa/m and 5 MPa/s≦v≦100 MPa/s at a position where a cross-sectional area perpendicular to a flow direction of a resin flow path in the vicinity of an outlet of the extrusion die is minimized when the propylene resin having been melt-kneaded is extrusion-foamed from an extrusion die.

$$\text{Pressure gradient}(k) = \frac{M}{(A/\pi)^{\left(\frac{1+n}{2}\right)}} \left\{ \frac{2^{\frac{1}{n}}(1+3n)Q}{nA} \right\}^n \quad \text{(I)}$$

$$\text{Decompression rate}(v) = \frac{M}{(A/\pi)^{(\frac{1+n}{2})}} \left\{ \frac{2^{\frac{1}{n}}(1+3n)}{n} \right\}^n \left(\frac{Q}{A}\right)^{(n+1)} \quad \text{(II)}$$

(in the formulae (I) and (II), M and n represent material constants, A represents the cross-sectional area (mm$^2$) at the position where the cross-sectional area perpendicular to the flow direction of the resin flow path in the vicinity of the outlet of the extrusion die is minimized, and Q represents a volume flow rate (mm$^3$/s) of the propylene resin passing through the outlet of the die.)

By forming the open-cell structure, a broken cell is formed in the foam. It is generally understood that a cell breaking phenomenon is caused by the following mechanisms.

Specifically, as a general cell breaking phenomenon, it is understood that the following phenomena 1 to 3 take place substantially at the same time: a cell breaking that is caused when the molten resin between the adjacent cells is thinned to be easily deformed due to an increase in a volume fraction of a foaming gas during a cell growing period and the molten resin undergoes a large deformation locally in accordance with a further cell growth (phenomenon 1); a cell breaking that is caused when the wall between the cells is further locally thinned due to a residual stress entailed by a viscoelastic property of the resin after the cell growth (phenomenon 2); and a cell breaking that is caused when the cell wall thinned to be deformable selectively undergoes a large deformation with a external deforming force applied to the foam (phenomenon 3).

On the other hand, when a non-crosslinked propylene-based resin is extrusion-foamed to form extruded foam, the cell breaking according to the mechanism of the above-described phenomenon 1 occurs owing to an insufficient melt tension of the resin before a stable state is achieved in which the cells formed in the resin sufficiently grows to form a wall. Therefore, extruded foam having a sufficient expansion ratio has not been obtainable.

When the cells are broken during the cell growing period, a plurality of cells are connected to form a continuous gas phase, such that the gas leaks outside the foam through the phase. With this arrangement, since the gas cannot be confined in the foam, the foam having a high expansion ratio cannot be formed.

As described above, forming the open-cell structure (forming the broken cells) causes the expansion ratio to be decreased. Accordingly, in order to provide the extruded foam having the open-cell structure (i.e., having the closed cell content of less than 40%) and the high expansion ratio of 10 or more, it is necessary to prevent the gas in the extruded foam from leaking outside by suppressing cell breaking as much as possible until the wall is formed in the extruded foam. By the time when a sufficiently high expansion ratio is being achieved or by the time when a continuous phase is formed by cell breaking after the sufficiently high expansion ratio is achieved, a framework of the extruded foam needs to be formed (i.e., the wall needs to be formed) to a certain degree, such that the shape is stabilized to prevent the gas from leaking into the outside.

Moreover, in order for the extruded foam to have an excellent sound absorption performance, the extruded foam must have not only the open-cell structure in which the broken cell structure is formed but also the high expansion ratio (10 or more, preferably 20 or more) for realizing a sufficient sound absorption performance within the foam.

For this purpose, the pressure gradient at a die outlet is set to be within an appropriate range so that the expansion ratio is prevented from being decreased due to the cell breaking during the foam growing period while the cell breaking is appropriately promoted by shear deformation of the die outlet, and a decompression rate at the die outlet is set to be within an appropriate range so that a cell nucleation density is achieved with which the cell becomes an appropriate size.

Specifically, the pressure gradient and the decompression rate at the die outlet are set to be within the appropriate ranges respectively (the pressure gradient (k): 50 MPa/m$\leq$k$\leq$800 MPa/m, the decompression rate (v): 5 MPa/s$\leq$v$\leq$100 MPa/s), whereby the polypropylene-based foam can be provided by a simplified method to have both the open-cell structure and the sufficient expansion ratio with an excellent sound absorption performance.

In contrast, when the pressure gradient (k) is less than 50 MPa/m, the cell breaking is caused inside the die to a prominent degree, and the extruded foam having the sufficient expansion ratio (10 or more) may not be obtained. On the other hand, when the pressure gradient (k) is more than 800 MPa/m, the open-cell structure may not be easily formed. The pressure gradient (k) is more preferably within a range of 100 MPa/m$\leq$k$\leq$500 MPa/m.

When the decompression rate (v) is less than 5 MPa/s, the cell breaking is caused inside the die to a prominent degree, and the extruded foam having the sufficient expansion ratio (10 or more) may not be obtained. On the other hand, when the decompression rate (v) is more than 100 MPa/s, the open-cell structure may not be easily formed, which may result in a further degradation of the sound absorption performance. The decompression rate (v) is more preferably within a range of 20 MPa/s$\leq$v$\leq$60 MPa/s.

Note that the material constants M (Pa·s$^n$) and n are values calculated as follows.

M (Pa·s$^n$) is a parameter showing a degree of viscosity of the propylene-based resin, and results of a logarithmic plot of a relationship between shear rate ($\gamma$) and shear viscosity ($\eta_M$), which are resin-specific values, are shown in FIG. 1. As shown in FIG. 1, the shear viscosity at a predetermined resin temperature ($\eta_M$) depends on the shear rate ($\gamma$). When the shear rate is within a range of $10^0$ to $10^2$ (s$^{-1}$), the value can be approximated in accordance with the following formula (IV-1). The material constant M shows a gradient in the formula (IV-1).

$$\eta_M = M\gamma^{n-1} \quad \text{(IV-1)}$$

Based on the formula (IV-1), the shear viscosity ($\eta_M$) obtained when the shear rate ($\gamma$) is $10^0$ (s$^{-1}$) may be used as M. Note that the value of M used in the present embodiment is determined based on the temperature and viscosity of the propylene-based resin and is usually about 500 to 30,000 (Pa·s$^n$).

The material constant n, which is a parameter showing a non-Newtonian property of a propylene-based resin, can be calculated based on the following formula (IV-2) using $\eta_M$ ($\gamma$=100) of the shear viscosity ($\eta_M$) obtained when the shear rate ($\gamma$) is 100 (s$^{-1}$). Note that the value of n used in the present invention is usually about 0.2 to 0.6.

$$n = \frac{1}{2}\log\left\{\frac{\eta_M(\gamma=100)}{M}\right\} + 1 \quad \text{(IV-2)}$$

In the formulae (I) and (II) above, the material constant of the propylene-based resin, M (which is a parameter showing the material viscosity level and variable depending on the viscosity and temperature of the material) is about 500 to 30,000, and n (which is a parameter showing non-Newtonian property of the material) is about 0.2 to 0.6. Accordingly, in order for the above-described pressure gradient (k) and decompression rate (v) to be set to be 50 MPa/m$\leq$k$\leq$800 MPa/m and 5 MPa/s$\leq$v$\leq$100 MPa/s respectively, it is preferable to set within the range of 0.1 to 4.0 mm$^2$ the cross-sectional area (A) of the flow path at the position where the cross-sectional area perpendicular to the flow direction of the resin flow path in the vicinity of the extrusion die outlet is minimized, and more preferable to set within the range of 0.3 to 2.0 mm$^2$. The volume flow rate Q (per inner tube die) of the propylene-based resin that passes through one die outlet may be set to 5 to 300 mm$^3$/s, preferably 10 to 150 mm$^3$/s.

The production method takes into consideration that the diameter of the resin flow path in the vicinity of the extrusion die outlet is not constant (i.e., for example, the method takes into consideration that the diameter of the resin flow path is reduced in the vicinity of the outlet of the extrusion die, in other words, the position where the cross-sectional area perpendicular to the flow direction of the resin flow path in the vicinity of the extrusion die outlet is minimized). When the diameter and the cross-sectional area of the resin flow path are nearly constant in the vicinity of the extrusion die outlet, such constant cross-sectional area may be used as the cross-sectional area (A) in the formulae (I) and (II).

In producing the extruded composite foam, for example, multiple threads may be extrusion-foamed to be mutually fused and bundled in a longitudinal direction through a tubular die assembly in which a plurality of tubular dies are provided or through an extrusion die in which a plurality of extrusion orifices are formed, so that an assembly of bundled threads of the extruded foam is obtained. By forming the assembly of the bundled threads of the extruded foam in this manner, in which the multiple threads are bundled together, the expansion ratio of the extruded foam may be increased, and the extruded composite foam having the high expansion ratio and a sufficient thickness may be easily formed in various shapes.

Producing such an assembly of the bundled threads of the extruded foam is known from JP 53-1262 A, for example.

Figure 2:
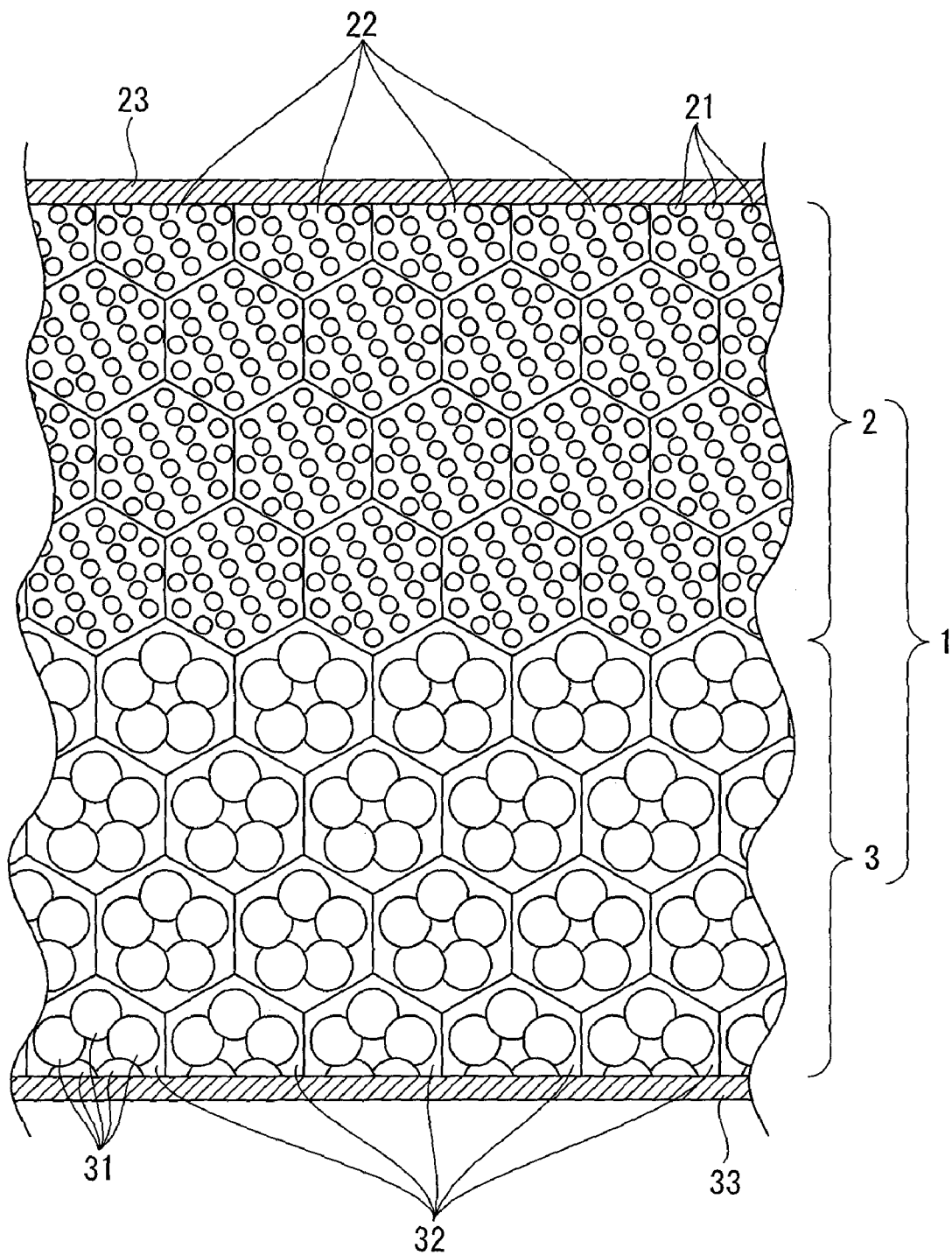
FIG. 2 is an illustration schematically showing extruded propylene-based resin composite foam according to a first embodiment of the present invention.

FIG. 2 is an illustration schematically showing the extruded propylene-based resin composite foam formed as the assembly of the bundled threads of the extruded foam according to the present embodiment. The extruded composite foam 1 (the assembly of the bundled threads of the extruded foam 1) is a laminate formed by the first extruded foam 2 and the second extruded foam 3.

The first extruded foam 2 is formed by bundling a multiple threads 22. In the thread 22, a plurality of foam cells 21 are formed at random. An average diameter of the foam cell 21 may be exemplarily 5 to 400 μm.

Likewise, the second extruded foam 3 is formed by bundling a multiple threads 32. In the thread 32, a plurality of foam cells 31 are formed at random. An average diameter of the foam cell 31 may be exemplarily 5 to 5000 μm.

In the extruded composite foam 1 shown in FIG. 2, epidermal layers 23, 33 are exemplarily formed on surfaces of the first extruded foam 2 and the second extruded foam 3 respectively.

Figure 3:
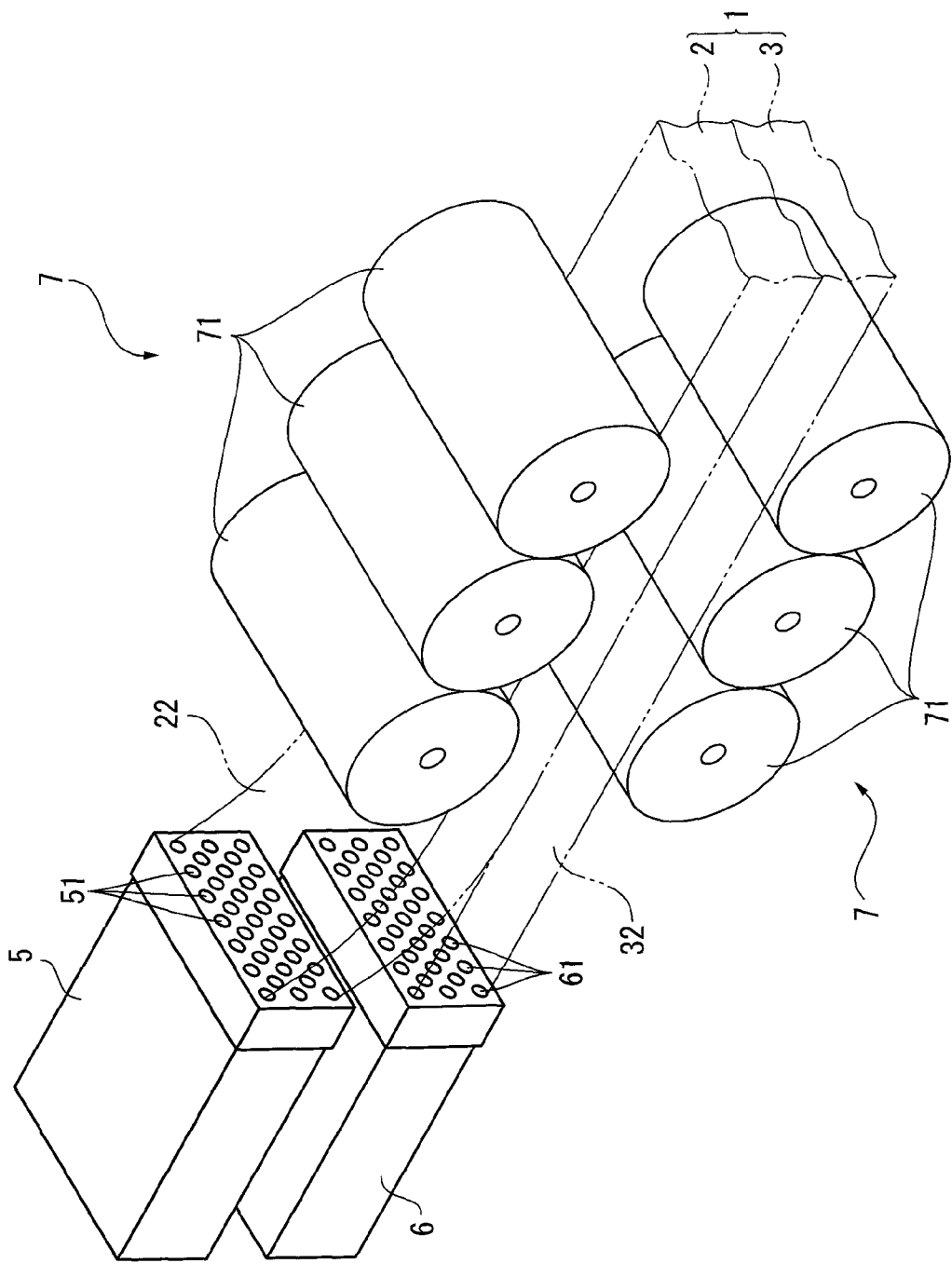
FIG. 3 is an illustration schematically showing first examples of an extrusion die and a cooling sizing roller used for producing the extruded propylene-based resin composite foam.

In order to obtain the extruded composite foam 1 arranged as in FIG. 2, the multiple threads 22 extruded from a first extrusion die 5 in which a plurality of extrusion orifices 51 are formed (the first extrusion die 5 is for producing the first extruded foam 2) is superposed on the multiple threads 32 extruded from a second extrusion die 6 in which a plurality of extrusion orifices 61 are formed (the second extrusion die 6 is for producing the second extruded foam 3) in a high-temperature state as shown in FIG. 3. Subsequently, a pair of cooling sizing rollers 7 cool and pressurize the superposed threads to form the laminate. As described above, the laminate is formed such that the threads 22 and the threads 32 are superposed in the high-temperature state to be subsequently cooled. With this arrangement, a step of bonding the first extruded foam 2 and the second extruded foam 3 may not be performed, thereby omitting an adhesive used in the bonding step.

In FIG. 3, the cooling sizing roller 7 includes three cooling rollers 71 and the pair of cooling sizing rollers 7 are disposed to face each other with the extruded composite foam 1 interposed therebetween. Each of the cooling rollers 71 is provided with a water-cooling temperature adjuster (not shown) adapted to adjust the temperature of the surface.

Although shapes of the threads 22, 32 forming the assembly of the bundled threads of the extruded foam 1 depend on shapes of the extrusion orifices 51, 61 formed in the extrusion dies 5, 6, the extrusion orifices 51, 61 may be shaped as desired (the extrusion orifices 51, 61 may be circular, rhombic, slit-shaped and the like). In producing, pressure loss at the outlets of the extrusion dies 5, 6 is preferably set to be 3 MPa to 50 MPa.

The shapes of the extrusion orifices 51, 61 formed in the outlets of the extrusion dies 5, 6 may be the same, or the extrusion orifices of various shapes may be formed in one of the extrusion dies 51, 61.

In addition, when, for instance, circular extrusion orifices are formed, the diameters of the extrusion orifices may be varied, and the circular extrusion orifices of various different diameters may be formed.

Incidentally, as described above, when the tubular die assembly of the multiple tubular dies or the like is used for producing the second extruded foam 3, the pressure gradient (k) and the decompression rate (v) in each orifice of the tubular dies are preferably set to satisfy the conditions of the above-described formulae (I) and (II).

In the extruded composite foam 1, the second extruded foam 3 may include a portion in which no thread 32 is provided (a non-thread portion 34).

Figure 4:
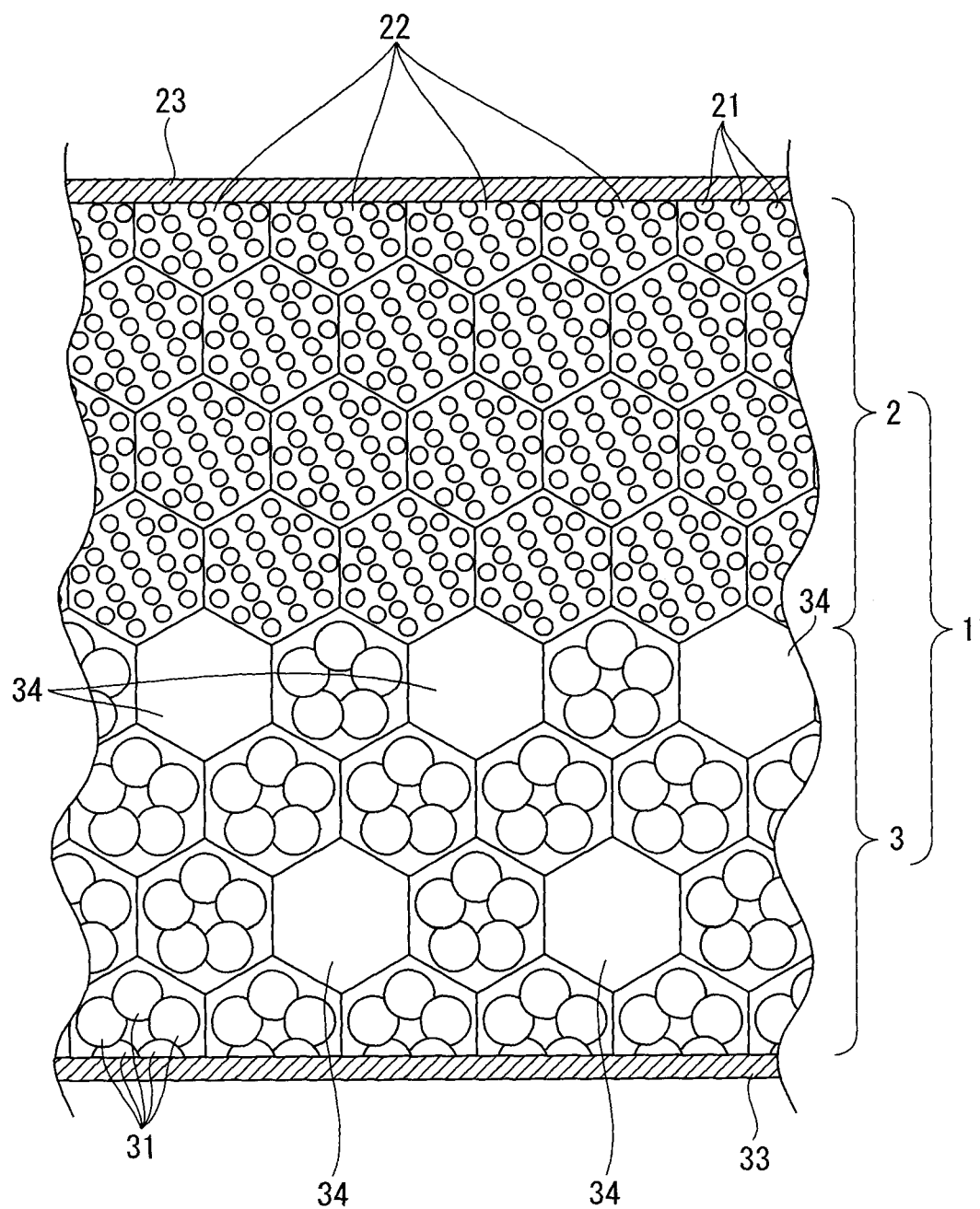
FIG. 4 is an illustration schematically showing extruded propylene-based resin composite foam according to a second embodiment of the present invention.

FIG. 4 is an illustration schematically showing an arrangement of the extruded propylene-based resin composite foam 1 shown in FIG. 2 in which the no-thread portion 34 is formed in the second extruded foam 3. A space provided by the no-thread portion 34 can effectively absorb acoustic waves within a specific frequency range, thereby further improving the sound absorption performance.

For forming the no-thread portion 34 in the second extruded foam 2, the plurality of extrusion orifices formed in the extrusion die (e.g. see the extrusion die 6 in FIG. 3) may be partially omitted so that no thread is extruded from the orifice-omitted portion of the die. With this arrangement, the no-thread portion 34 is formed as desired to provide the space.

Furthermore, at least a part of the surface of the second extruded foam 3 may communicate with the outside air in the extruded composite foam 1 according to the present embodiment. By arranging the second extruded foam 3 to communicate with the outside, the space inside the foam can efficiently absorb an acoustic wave from the outside, thereby enhancing the sound absorption performance.

In order for the second extruded foam 3 to communicate with the outside air at the surface side, a hole may be formed in the surface (the epidermal layer 33 in FIG. 2) of the second extruded foam 3 or an opening may be formed by breaking the epidermal layer 33. When there is no epidermal layer 33 formed on the second extruded foam 3, the hole or the opening may be formed in a surface portion of the second extruded foam. A diameter of the hole is preferably 0.1 to 3.0 mm.

The frequency of the absorbed acoustic wave depends on the size of the hole (diameter, depth, volume, etc). When a frequency of a to-be-absorbed noise is specified, the size of the hole (diameter, depth, volume, etc.) may be determined as desired in accordance with the specified frequency, thereby realizing an efficient sound absorption performance.

Figure 5:
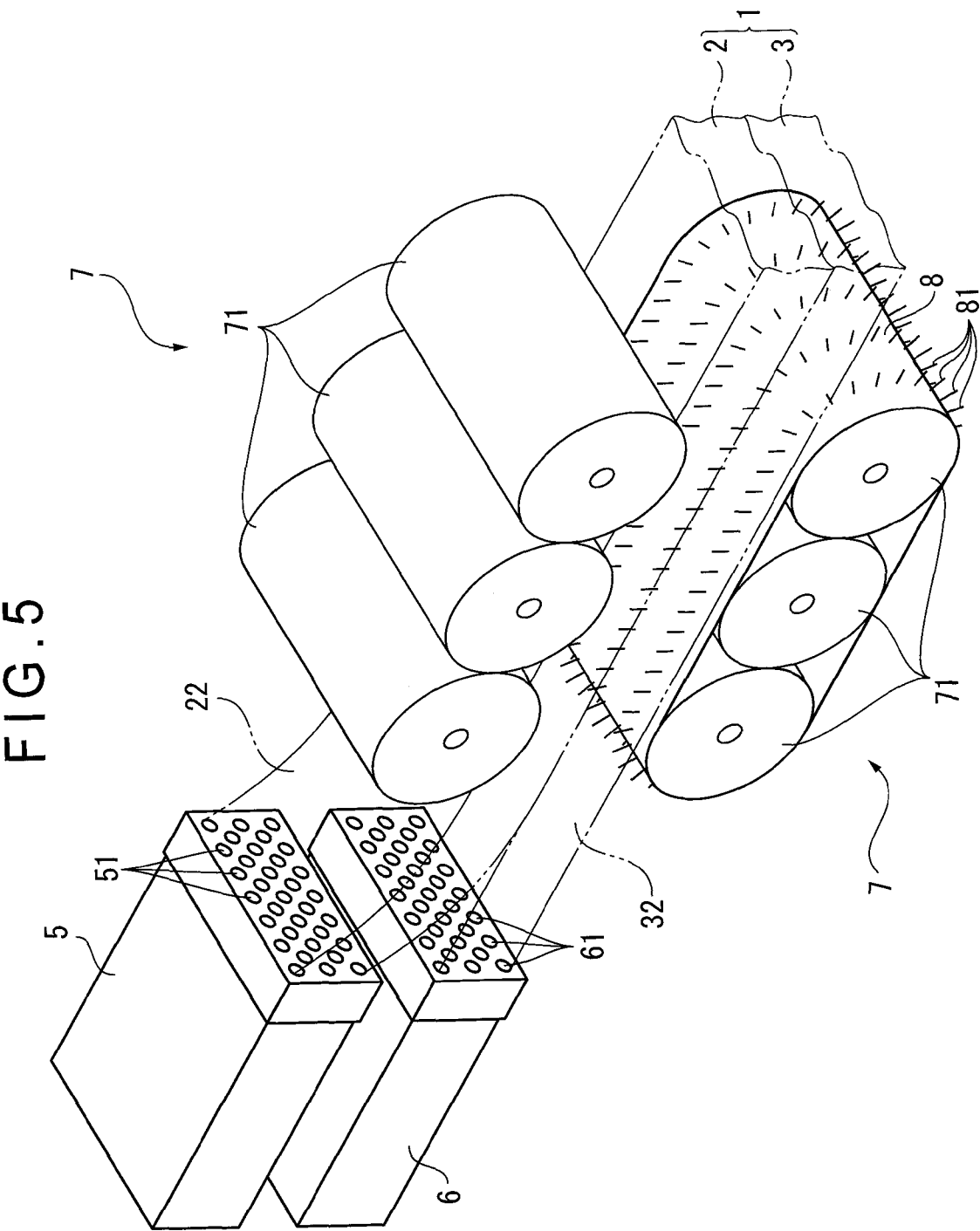
FIG. 5 is an illustration schematically showing second examples of an extrusion die and a cooling sizing roller used for producing the extruded propylene-based resin composite foam.

For forming the hole in the surface side of the second extruded foam 3, for instance, as shown in FIG. 5, a belt 8 having multiple acicular bodies 81 may be wound around the cooling sizing roller 7 shown in FIG. 3. By putting the second extruded foam 3 therethrough, the hole is formed in the surface side of the second extruded foam 3 by the acicular bodies 81 as desired.

For forming the opening by cutting the epidermal layer 33 or the surface portion of the second extruded foam 3, the opening may be formed by a cutting blade in producing the extruded composite foam 1 (in a step of extrusion-foaming) or the opening may be formed by the cutting blade in a secondary processing after the extruded composite foam 1 is produced.

In producing the extruded composite foam 1 according to the present embodiment, the first extruded foam 2 and the second extruded foam 3 may be foamed by physical foaming in which a fluid (gas) is injected into a molten resin material in a molding operation or by chemical foaming in which the resin material is mixed with foaming agent.

As a fluid injected in the physical foaming, inactive gas such as carbon dioxide (carbon dioxide gas), nitrogen gas and the like may be used. As a usable foaming agent in the chemical foaming, for instance, azodicarbonamide, azobisisobutyronitrile and the like may be used.

In the above-described physical foaming, carbon dioxide gas and nitrogen gas in a supercritical state is preferably inserted into the molten resin material.

The "supercritical state" herein refers to a state where a density of gas becomes equal to that of liquid so that the gas and liquid cannot distinguishably exist, due to exceeding of the limiting temperature and the limiting pressure at which both the gas and the liquid can coexist. A fluid produced in this supercritical state is called a supercritical fluid. In addition, the temperature and the pressure in a supercritical state are respectively called a supercritical temperature and a supercritical pressure. For example, for carbon dioxide gas the supercritical temperature is 31° C. while the supercritical pressure is 7.4 MPa. Carbonic dioxide gas or nitrogen gas in the supercritical state may be injected in an amount of about 4 to 15 mass % of the resin material. The gas can be injected into the molten resin material in a cylinder.

A shape of the extruded composite foam 1 is not specifically limited but may include any known shape of structural materials such as a plate shape, a cylinder shape, a rectangle shape, a convex shape and a concave shape.

The extruded propylene-based resin composite foam 1 according to the present embodiment, which includes the first extruded foam 2 and the second extruded foam 3, preferably provides the following effects.

Specifically, since the first extruded foam 2 forming the extruded composite foam 1 has the closed cell content of 40 percent or more and the expansion rate of 10 or more, the multiple closed cells prevent heat from being conducted, thereby providing the extruded foam excellent in the insulation efficiency. In addition, the extruded foam is also excellent in a mechanical strength such as an impact strength and a moisture resistance. By arranging the first extruded foam to have the epidermal layer 23 (skin layer) on the surface layer, the first extruded foam is also excellent in a sound insulation.

In addition, since the second extruded foam 3 has the closed cell content of less than 40 percent, an open cell structure in which a gas phase continuously connecting the cells is formed is provided to the second extruded foam 3 as desired. The second extruded foam 3 also has the expansion ratio of 10 or more, such that a content of the gas phase in the foam 3 is increased, thereby providing the extruded foam excellent in the sound absorption performance.

According to the present embodiment, the extruded propylene-based resin composite foam 1 including the first extruded foam 2 and the second extruded foam 3 is extruded foam that is excellent in the insulation efficiency and the sound absorption performance. In addition, by setting the expansion ratio to be 10 or more, the weight of the foam can be reduced, whereby the usability is enhanced.

Since the propylene-based resin as the material is excellent in a recycling efficiency, a heat-resistance, a chemical resistance and the like, the extruded propylene-based resin composite foam according to the present embodiment also has these properties (the recycling efficiency, the heat-resisting property, the chemical resistance and the like). By using the propylene-based resin, which is a low cost material, the extruded composite foam having the above-described effects can be provided at low cost.

The extruded composite foam 1 according to the present embodiment, which is excellent in the insulation efficiency and the sound absorption performance as described above is applicable to a structural material in the fields of automobiles (interior components such as ceiling, floor, door and the like) and a structural material in the fields of construction and civil engineering (building material and the like).

Particularly, a residential structural material in the fields of construction and civil engineering is often required to have a sound absorption performance on the inner side and an insulation efficiency on the outer side. Thus, when the extruded composite foam 1 according to the present embodiment is applied to the structural material, the extruded composite foam 1 may be arranged such that the first extruded foam 2 is disposed on the inner side while the second extruded foam 3 is disposed on the outer side, whereby the effects of the extruded composite foam can be maximally exhibited.

Second Embodiment

Extruded propylene-based resin composite foam and a producing method of the extruded propylene-based resin composite foam according to a second embodiment of the present invention will be described below.

The extruded propylene-based resin composite foam according to the present embodiment (hereinafter, may be referred to as "extruded composite foam") is provided by extrusion-foaming a propylene-based resin. The propylene-based resin forming the extruded foam has an olefin-based polymer whose loss tangent (tan δ) is 0.04 to 100 at a temperature of 298K and a frequency of 10 Hz. The extruded composite foam includes: first extruded foam whose closed cell content is 40 percent or more and whose expansion ratio is 10 or more; and second extruded foam whose closed cell content is less than 40 percent and whose expansion ratio is 10 or more. With this arrangement, the extruded composite foam may have an insulation efficiency, a sound absorption performance and a vibration suppressive performance with a light weight.

Although the propylene-based resin of the present embodiment is basically identical to that of the first embodiment, a specific olefin-based polymer is added to the propylene-based polymer of the first embodiment as a material, from which the extruded composite foam that is particularly excellent in the vibration suppressive performance is formed.

Specific Olefin-Based Polymer:

In the extruded propylene-based resin composite foam according to the present embodiment, the propylene-based resin as the material includes the olefin-based polymer whose loss tangent (tan δ) is 0.04 to 100 at the temperature of 298K and the frequency of 10 Hz (the specific olefin-based polymer).

The specific olefin-based polymer is added to the propylene-based resin of the first embodiment as the material, such that the specific olefin-based polymer, which is a viscous substance, can be uniformly dispersed on a wall surface of foam cells of the extruded foam formed of the propylene-based resin, thereby providing the extruded composite foam that is excellent in the vibration suppressive performance.

The specific olefin-based polymer, whose loss tangent (tan δ) is 0.04 to 100 at the temperature of 298K and the frequency of 10 Hz, more preferably has the loss tangent of 0.04 to 10. Since the specific olefin-based polymer having the loss tangent (tan δ) of 0.04 to 100 shows viscous behavior, the extruded foam formed of the propylene-based resin containing the specific olefin-based polymer can have the excellent vibration suppressive performance. On the other hand, when the loss tangent is less than 0.04, a sufficient vibration suppressive performance cannot be obtained. When the loss tangent is more than 100, since the foam shows a solid behavior, the energy is not absorbed into the foam, so that the extruded foam is vibrated together with the rigid propylene-based resin. Thus, the vibration suppressive performance cannot be obtained in the latter case, either.

Note that the loss tangent may be measured by, for example, a commercially-available solid viscoelasticity measuring apparatus (for example, DMS6100: manufactured by Seiko Instruments Inc.).

The specific olefin-based polymer (a) is preferably added to the polypropylene-based resin (b) so that a weight ratio (a/b) is 1/100 to 80/100, the weight ratio (a/b) is more preferably 5/100 to 60/100. Since the polypropylene-based resin contains the olefin-based polymer at the weight ratio of 1/100 to 80/100, the olefin-based polymer is appropriately dispersed on the wall surface of the foam cells in the molded foam formed of the polypropylene-based resin, thereby enhancing the vibration suppressive performance.

The specific olefin-based polymer may be prepared from any one of resin materials disclosed in, for example, WO 03/070788, WO 03/070790, and Japanese Patent No. 3255697. Specifically, high-fluidic 1-butene-based copolymer or 1-butene-based polymer analogous thereto as disclosed in WO 03/070788 may be used.

Specifically, as a 1-butene-based copolymer, a copolymer of a first mode or a copolymer of a second mode as shown below may be used. The use of the copolymer reliably provides the extruded foam with the vibration suppressive performance.

The copolymer of the first mode satisfies the following conditions (1) to (3):
(1) an intrinsic viscosity [η] of the copolymer measured in a tetralin solvent at 135° C. is 0.01 to 0.5 dL/g;
(2) the copolymer is a crystalline resin whose melting point ($T_m$-D) is 0 to 100° C., the melting point being defined as the top of peak observed using a differential scanning calorimeter (DSC) at a highest temperature side of a melting endothermic curve, the melting endothermic curve being obtained by heating up at a rate of 10° C./min after keeping a sample at −10° C. under nitrogen atmosphere for 5 minutes; and
(3) a stereoregularity index {(mmmm)/(mmrr+rmmr)} of the copolymer is 30 or less.

The 1-butene polymer of the second mode satisfies the following conditions (1'), (2) and (3'):
(1') an intrinsic viscosity [η] of the polymer measured in a tetralin solvent at 135° C. is 0.25 to 0.5 dL/g;
(2) the polymer is a crystalline resin whose melting point ($T_m$-D) is 0 to 100° C., the melting point being defined as the top of peak observed using a differential scanning calorimeter (DSC) at a highest temperature side of a melting endothermic curve, the melting endothermic curve being obtained by heating up at a rate of 10° C./min after keeping a sample at −10° C. under nitrogen atmosphere for 5 minutes; and
(3') a mesopentad fraction (mmmm) of the polymer obtained from a $^{13}$C-nuclear magnetic resonance (NMR) spectrum is 73 percent or less.

In the 1-butene-based polymer of the first mode, the intrinsic viscosity [η] measured in the tetralin solvent at 135° C. is 0.01 to 0.5 dL/g. The intrinsic viscosity [η] is preferably 0.1 to 0.5 dL. When the intrinsic viscosity [q] is smaller than 0.01 dL/g, the solid property (strength) may be degraded. In contrast, when the intrinsic viscosity exceeds 0.5 dL, the fluidity may be impaired.

On the other hand, in the 1-butene-based polymer of the second mode, the intrinsic viscosity [η] measured in the tetralin solvent at 135° C. is 0.25 to 0.5 dL/g. The intrinsic viscosity [η] is preferably 0.3 to 0.5 dL/g.

When the intrinsic viscosity [η] is smaller than 0.25 dL/g, molecules for binding the crystals are lacked, so that a toughness (tensile elongation at break) can be impaired. When the intrinsic viscosity exceeds 0.5 dL/g, the viscosity is unnecessarily increased to degrade the fluidity, whereby the foam may be defectively molded.

In terms of elastic property, the 1-butene-based polymers of the first and second modes are required to be a crystalline resin whose melting point ($T_m$-D) is 0 to 100° C. measured with the differential scanning calorimeter (DSC), and the melting point is preferably 0 to 80° C.

The melting point ($T_m$-D) is measured by differential scanning calorimetry (abbreviated as DSC). Specifically, the melting point ($T_m$-D) to be measured is defined as the top of the peak observed with a differential scanning calorimeter (DSC-7, manufactured by PerkinElmer, Inc.) at the highest temperature side of the melting endothermic curve. The melting endothermic curve is obtained by keeping 10 mg of sample at −10° C. under nitrogen atmosphere for 5 minutes and then heating up the sample at a rate of 10° C./min. The term "crystalline resin" used herein refers to a resin in which the $T_m$-D is observed.

In the 1-butene-based polymer of the first mode, the stereoregularity index {(mmmm)/(mmrr+rmmr)} is 30 or less, preferably 20 or less, and more preferably 15 or less. When the stereoregularity index exceeds 30, the flexibility of the viscous substance may be degraded and the vibration-absorbing effect is impaired.

The mesopentad fraction (mmmm) is preferably 90 percent or less, more preferably 85 percent or less and further preferably 80 percent or less. When the mesopentad fraction (mmmm) exceeds 90 percent, the flexibility or secondary moldability may be degraded.

In the 1-butene-based copolymer of the second mode, the mesopentad ratio is 73 percent or less. When the mesopentad fraction (mmmm) exceeds 73%, physical crosslink points are exceedingly increased and the flexibility may be degraded.

The mesopentad ratio (mmmm) of the 1-butene-based copolymer was obtained based on methods proposed in Asakura et al., "Polymer Journal, 16, 717 (1984)", J. Randall et al., "Macromol. Chem. Phys., C29, 201 (1989)" and V. Busico et al., "Marcomol. Chem. Phys., 198, 1257 (1997)". In short, the $^{13}$C-nuclear magnetic resonance spectrum is used to measure signals of methylene and methine group to obtain the mesopentad fraction in a poly (1-butene) molecule.

The measurement of the $^{13}$C-nuclear magnetic resonance spectrum may be performed using the following device and under the following conditions.

| | |
|---|---|
| Device: | JNM-EX-400 type 13C-NMR device manufactured by JEOL Ltd. |
| Method: | Proton-complete-decoupling method |
| Concentration: | 230 mg/ml |
| Solvent: | a mixture solvent of 1,2,4-trichlorobenzene and heavy benzene (90:10) (volume ratio) |
| Temperature: | 130° C. |
| Pulse width: | 45° |
| Pulse repetition time: | 4 sec. |
| Operation: | 10,000 times |

The stereoregularity index {(mmmm)/(mmrr+rmmr)} of the 1-butene-based polymer may be calculated from a value obtained by measuring (mmmm), (mmrr), and (rmmr) in accordance with the above-mentioned methods.

In addition, in the 1-butene-based polymers of the first and second modes, weight average molecular weights ($M_w$) measured by the GPC method is preferably 10,000 to 100,000 in addition to the above-mentioned requirements. When $M_w$ is less than 10,000, the solid property (strength) may be degraded. In contrast, when $M_w$ exceeds 100,000, the fluidity may be impaired to damage a workability.

The above-mentioned $M_w/M_n$ is a value calculated from the values equivalent to the mass average molecular weight ($M_w$) and the number average molecular weight ($M_n$) of polystyrene. The mass average molecular weight ($M_w$) and the number average molecular weight ($M_n$) are measured in accordance with the GPC method using the following device under the following conditions.

| (GPC measurement device) | |
|---|---|
| Column: | TOSO GMHHR-H(S) HT |
| Detector: | RI detector for liquid chromatography; WATERS 150 C. Measurement conditions |

| (Measurement Condition) | |
|---|---|
| Solvent: | 1,2,4-trichlorobenzene |
| Measurement temperature: | 145° C. |
| Flow rate: | 1.0 ml/min. |
| Sample concentration: | 2.2 mg/ml |
| Injection amount: | 160 µl |
| Analytic carve: | Universal Calibration |
| Analytic program: | HT-GPC (Ver. 1.0) |

In the 1-butene-based polymer of the first mode, the elongation modulus measured in a tension test based on JIS K7113 is preferably 500 MPa or less, and more preferably 300 MPa or less. When the elongation modulus exceeds 500 MPa, an elasticity may not be sufficiently obtained.

When the 1-butene-based polymer is a copolymer, the copolymer is preferably a random copolymer. In addition, a structural unit obtained from 1-butene is preferably 50 mol percent or more, and more preferably 70 mol percent or more. When the structural unit derived from 1-butene is less than 50 mol percent, the secondary moldability may be impaired.

When the 1-butene-based polymer is a copolymer, a randomness index R obtained by the following expression (U) from an α-olefin chain is preferably 1 or less.

$$R=4[\alpha\alpha][BB]/[\alpha B]^2 \quad (U)$$

(wherein [αα] represents an α-olefin chain rate, [BB] represents a butene chain rate, and [αB] represents an α-olefin-butene chain rate.)

R is an index representing randomness, and the smaller the value of R is, the more α-olefin (comonomer) is isolated, such that the composition becomes uniform. The value of R is preferably 0.5 or less, and more preferably 0.2 or less.

When R is 0, the αα chain disappears, such that only a completely isolated chain remains in the α-olefin chain.

R and the content of butene when the 1-butene-based polymer is a propylene/butene copolymer may be measured as follows.

Specifically, the content of butene and R may be calculated in accordance with the following method by measuring a $^{13}$C-NMR spectrum under the following conditions using JNM-EX400 type NMR device manufactured by JEOL Ltd.

| (Measurement Condition) | |
|---|---|
| Sample concentration: | 220 mg/NMR solution 3 ml |
| NMR solution: | 1,2,4-trichlorobenzene/benzene-d6 (90/10 vol %) |
| Measurement temperature: | 130° C. |
| Pulse width: | 45° |
| Pulse repetition time: | 10 sec. |
| Accumulated times: | 4,000 times |

With respect to a PP, PB and BB chain, under the above-mentioned measurement conditions, PP, PB and BB diad chain fractions in the copolymer molecular chain are obtained by measuring a Sαα carbon signal of $^{13}$C-nuclear magnetic resonance spectrum in accordance with a method proposed in J. C. Randall, Macromolecules, 1978, 11, 592.

From the respective diad chain fractions (mol %) thus obtained, the butene content and the randomness index R are obtained from the following expressions (W) and (X).

$$\text{Butene content (mol \%)} = [BB] + [PB]/2 \quad (W)$$

$$\text{Random index } R = 4[PP][BB]/[PB]2 \quad (X)$$

(in the expressions (W) and (X), [PP] represents a propylene chain fraction, [BB] represents a butene chain fraction, and [PB] represents a propylene-butene chain fraction).

In addition, the butene content and R may be measured as follows when the 1-butene-based polymer is an octane-butene copolymer. Specifically, the content of butene and R may be calculated in accordance with the following method by measuring a $^{13}$C-NMR spectrum under the following conditions using JNM-EX400 type NMR device manufactured by JEOL Ltd.

| (Measurement Condition) | |
|---|---|
| Sample concentration: | 220 mg/NMR solution 3 ml |
| NMR solution: | 1,2,4-trichlorobenzene/benzene-d6 (90/10 vol %) |
| Measurement temperature: | 130° C. |
| Pulse width: | 45° |
| Pulse repetition time: | 10 sec. |
| Accumulated times: | 4,000 times |

Under the above-described measurement conditions, a $S\alpha\alpha$ carbon signal of $^{13}C$-nuclear magnetic resonance spectrum is measured and then OO, OB and BB diad chain fractions in the copolymer molecular chain are respectively obtained from the peak strengths derived from the BB chain observed in 40.8 to 40.0 ppm, the OB chain observed in 41.3 to 40.8 ppm and the OO chain observed in 42.5 to 41.3 ppm.

From the respective diad chain fractions (mol %) thus obtained, the butene content and the random index R are obtained from the following expressions (Y) and (Z).

$$\text{Butene content (mol \%)}=[BB]+[OB]/2 \qquad (Y)$$

$$\text{Random index } R=4[OO][BB]/[OB]^2 \qquad (Z)$$

(in the expression (Y) and (Z), [OO] represents an octane chain fraction, [BB] represents a butene chain fraction, and [OB] represents an octane-butene chain fraction.)

The above-described 1-butene-based copolymers can be easily obtained in accordance with manufacturing methods of 1-butene-based copolymer disclosed in WO 03/070788.

Manufacturing of Extruded Propylene-Based Resin Composite Foam:

The extruded composite foam according to the present embodiment can be obtained by extrusion-foaming the propylene-based resin of the first embodiment and the above-described specific olefin-based polymer. A known extrusion foaming device can be used as a production device, which heats the propylene-based resin and the like to be melted, kneads the resin and the like with an appropriate shearing stress applied thereto and extrusion-foams the resin and the like from a tubular die. An extruder included in the production device may be either a uniaxial extruder or a biaxial extruder. As the extrusion foaming device, for example, a tandem-type extrusion foaming device disclosed in JP-A-2004-237729 may be used, to which two extruders are connected.

The production of the second extruded foam of the extruded composite foam according to the present embodiment is identical to that according to the first embodiment, thus the description is omitted.

The extruded propylene-based resin composite foam 1 according to the present embodiment can have the following effects as desired in addition to the effects obtained in the first embodiment.

Specifically, since the extruded propylene-based resin composite foam 1 according to the present embodiment includes, in addition to the propylene-based resin as the material, the olefin-based polymer whose loss tangent (tan δ) is 0.04 to 100 at the temperature of 298 K and the frequency of 10 Hz, the olefin-based polymer can be uniformly dispersed on the cell wall of the foam cells forming the molded foam. Thus, the foam can efficiently absorb vibrations, thereby providing the extruded foam that is excellent in the vibration suppressive performance.

According to the present embodiment, the extruded propylene-based resin composite foam 1 including the first extruded foam 2 and the second extruded foam 3 is extruded foam that is excellent in the insulation efficiency, the sound absorption performance and the vibration suppressive performance. In addition, by setting the expansion ratio to be 10 or more, the weight of the foam can be reduced, whereby the usability is enhanced.

The extruded composite foam 1 according to the present embodiment, which is excellent in the insulation efficiency, the sound absorption performance and the vibration suppressive performance as described above, is applicable to a structural material in the fields of automobiles (a vibrating substrate surface such as a door panel, a fender panel, a ceiling panel, a trunk-lid, and the like in addition to interior components such as ceiling, floor, door and the like) and a structural material in the fields of construction and civil engineering (building material and the like).

Particularly, a residential structural material in the fields of construction and civil engineering is often required to have a sound absorption performance on the inner side and an insulation efficiency on the outer side. Thus, when the extruded composite foam 1 according to the present embodiment is applied to the structural material, the extruded composite foam 1 may be arranged such that the first extruded foam 2 is disposed on the inner side while the second extruded foam 3 is disposed on the outer side, whereby the effects of the extruded composite foam can be maximally exhibited.

Third Embodiment

Extruded propylene-based resin composite foam and a producing method of the extruded propylene-based resin composite foam according to a third embodiment of the present invention will be described below.

Although the propylene-based resin of the present embodiment is basically identical to that of the first embodiment, a fibrous filler is added to the propylene-based resin of the first embodiment as a material, from which the extruded composite foam that is particularly excellent in an energy-absorbing capability is formed.

Figure 9:
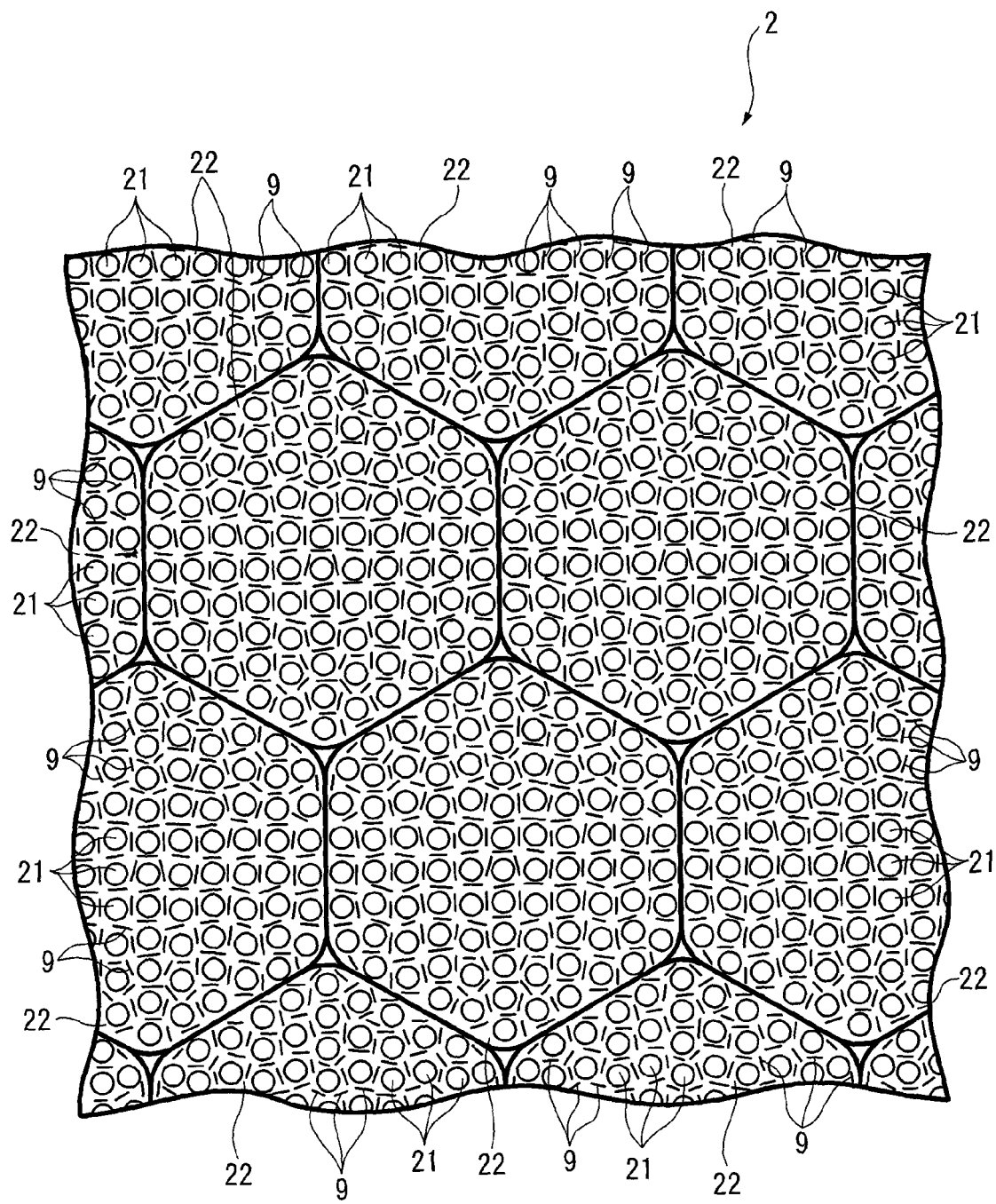
FIG. 9 is an illustration schematically showing first extruded foam according to a third embodiment.
Figure 10:
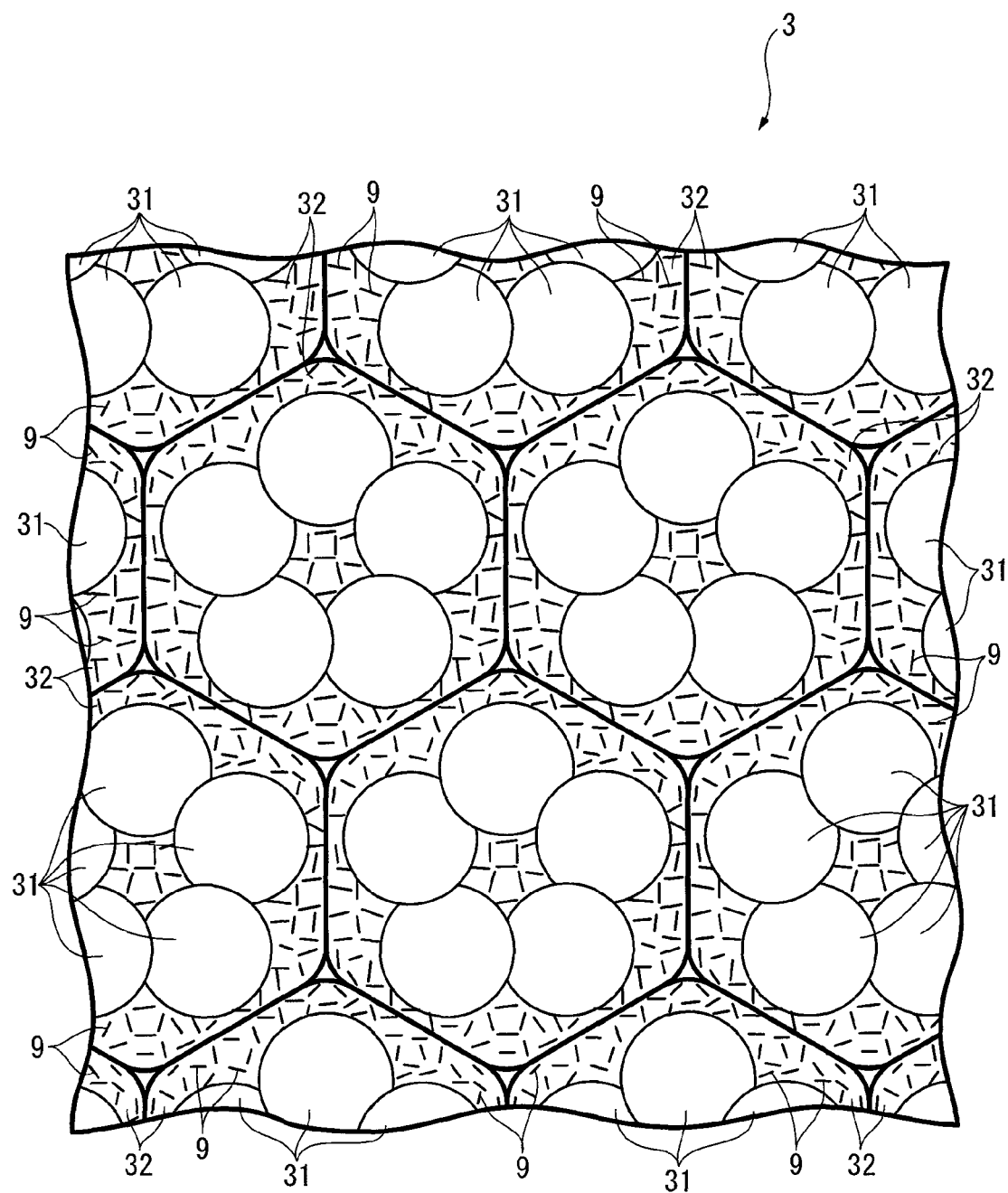
FIG. 10 is an illustration schematically showing second extruded foam according to the third embodiment.

FIGS. 9 and 10 are illustrations showing an arrangement of extruded propylene-based resin composite foam 1 (hereinafter, may be referred to as "extruded composite foam 1") according to the present embodiment. FIG. 9 is an illustration schematically showing an arrangement of first extruded foam 2 while FIG. 10 is an illustration schematically showing second extruded foam 3.

Numerals used in FIG. 9 respectively refer to the following members: 2 to first extruded foam; 21 to foam cell; and 22 to thread (see FIG. 2). Numerals used in FIG. 10 respectively refer to the following members: 3 to second extruded foam; 31 to foam cell; 32 to thread (see FIG. 2); and 9 to fibrous filler.

The extruded propylene-based resin composite foam 1 according to the present embodiment is provided by extrusion-foaming a propylene-based resin. The extruded composite foam 1 includes: the first extruded foam 2 shown in FIG. 9 whose closed cell content is 40 percent or more and whose expansion ratio is 10 or more; and the second extruded foam 3 shown in FIG. 10 whose closed cell content is less than 40 percent and whose expansion ratio is 10 or more. With this arrangement, the extruded composite foam 1 may have an insulation efficiency and a sound absorption performance with a light weight.

As shown in FIGS. 9 and 10, the molding material forming the extruded composite foam 1 includes a fibrous filler 9 whose content is more than 0 mass % and 60 mass % or less of the entire molding material. The fibrous filler 9 is disposed at random due to the foam cells 21, 31 in the first extruded foam 2 and the second extruded foam 3, thereby enhancing the energy-absorbing capability.

The extruded composite foam 1 according to the present embodiment, as arranged in the above-described manner, can have the energy-absorbing capability in addition to the insulation efficiency and the sound absorption performance.

The extruded propylene-based resin composite foam 1 according to the present embodiment contains the fibrous filler 9 whose content is more than 0 mass % and 60 mass % or less of the entire molding material forming the extruded foam. When the content of the fibrous filler 9 exceeds 60 mass %, the foam moldability is degraded due to the excessive content of the fibrous filler 9. In addition, the cell structure is excessively broken, whereby the expansion ratio is reduced.

The content of the fibrous filler 9 is preferably within a range of 5 to 30 mass % of the entire molding material. When the content of the fibrous filler is less than 5 mass %, the energy-absorbing capability may not be easily enhanced. On the other hand, when the content of the fibrous filler exceeds 30 mass %, there is a risk that the foam moldability may be degraded. Further, when the content exceeds 30 mass %, the fibrous filler may protrude from the wall surface of the foam cells. As the case may be, the fibrous filler may excessively break the cell structure to reduce the expansion ratio, which is not favorable.

The fibrous filler 9 contained in the molding material may be, for example, carbon fibers, grass fibers and other inorganic fibers (silicon carbon fibers, alumina fibers, basic magnesium sulfate whisker and the like), among which grass fibers are preferable. In addition, the carbon fibers include cellulose-based, PAN-based and pitch-based carbon fibers.

The fibrous filler 9 may be of a whisker shape, which is usually called a fiber shape. An exemplary fibrous filler may have an average fiber length of about 0.02 to 10 mm (in case of the whisker shape, about 0.01 to 0.15 mm) and an average fiber diameter of 0.1 to 20 μm.

When the glass fiber is used as the fibrous filler 9, the glass fiber preferable has an average fiber diameter in a range of 5 μm to 20 μm and an average fiber length in a range of 0.1 mm to 10 mm.

20 percent or more of the total fibers contained in the fibrous fillers 9 are arranged in the thickness direction of the extruded composite foam 1. The fibrous filler 9 arranged in the thickness direction means that an angle at which the fiber length direction is arranged to the axis of the thickness direction is 0 (parallel to the thickness direction) to 45 degrees.

The fibrous filler 9 is arranged at random due to the foam cells 21, 31. Specifically, the fibrous filler 9 is arranged so that the direction of fiber length may be aligned along the extruding direction of the extruded composite foam 1. Additionally, due to the presence of the foaming foam cells 21, 31, the fibrous filler 9 is arranged in the thickness direction. With this arrangement, a high stress arises even when a slight strain is applied to the thickness direction of the extruded composite foam 1, thereby enhancing the energy-absorbing capability.

Figure 11:
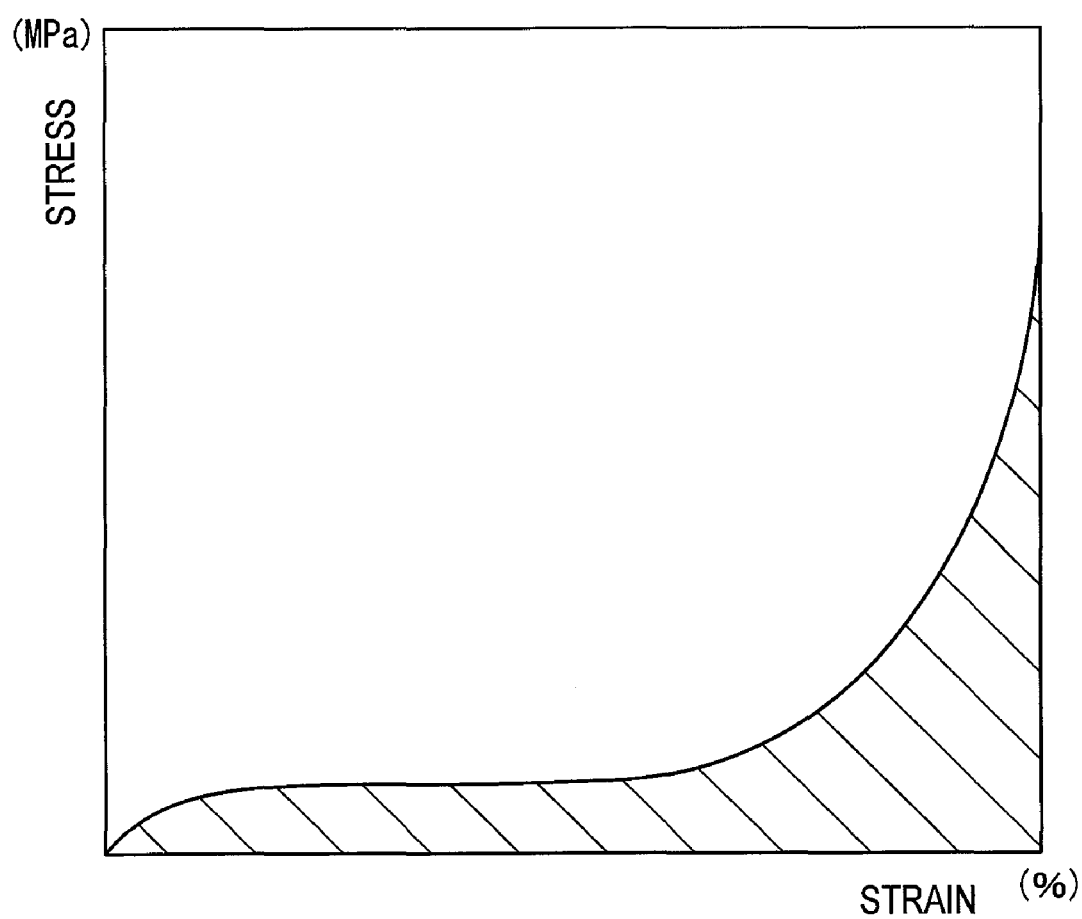
FIG. 11 is a diagram showing a stress-strain curve of extruded propylene-based resin foam that includes no fibrous filler according to the third embodiment.

For more detailed explanation, FIG. 11 shows the stress-strain relationship of the extruded propylene-based resin foam containing no fibrous filler 9. In FIG. 11, the shaded portion indicates the amount of energy absorption. The larger the area of the shaded portion is, the higher the energy-absorbing capability is.

On the other hand, the fibrous filler 9 is contained in the extruded composite foam 1 according to this embodiment, and the fibrous filler 9 is arranged not only in the extruding direction but also in the thickness direction of the extruded composite foam 1. Therefore, the stress-strain relationship as shown in FIG. 12 is obtained.

Figure 12:
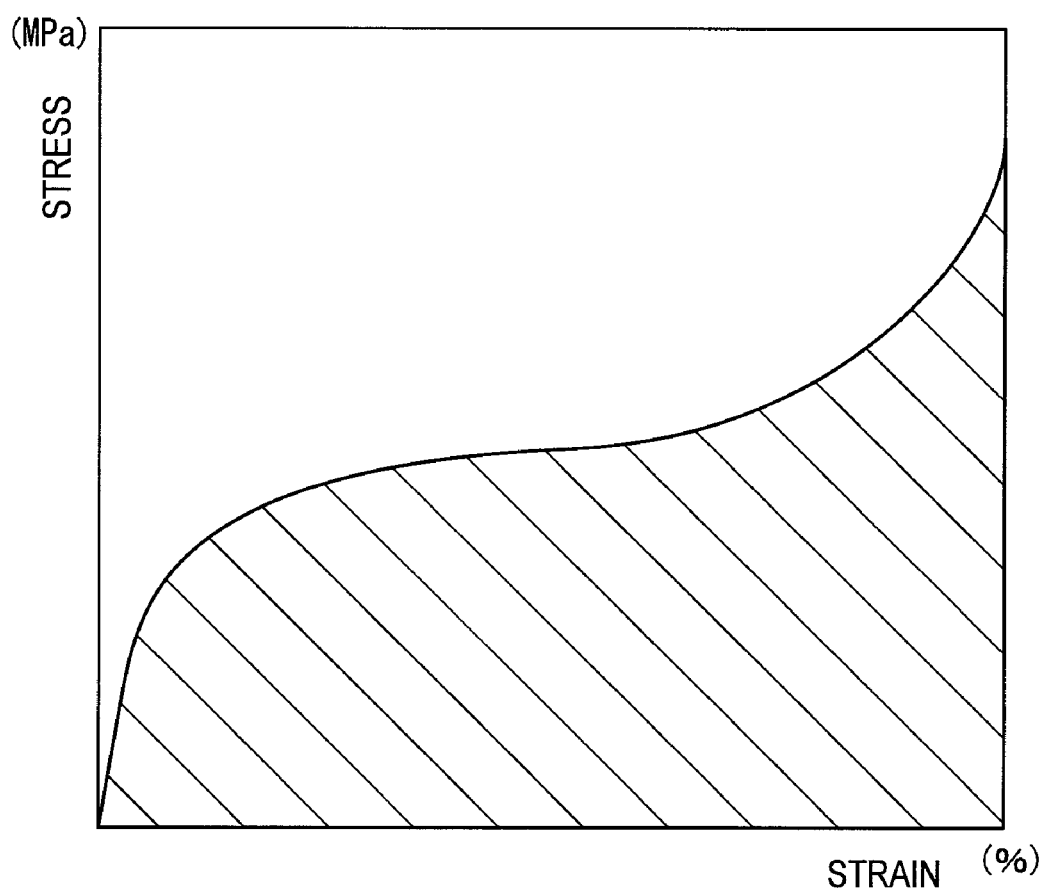
FIG. 12 is a diagram showing a stress-strain curve of extruded propylene-based resin composite foam according to the third embodiment.

In other words, a small strain generates a large stress and the area of the shaded portion of FIG. 12 becomes larger than that of the shaded portion of FIG. 11. Therefore, the energy-absorbing capability is proven to be improved. In particular, in the extruded composite foam 1 according to the present embodiment, 20 percent or more of the fibrous filler 9 are arranged in the thickness direction of the extruded composite foam 1, thereby enhancing the energy-absorbing capability.

Production of Extruded Propylene-Based Resin Composite Foam:

The extruded composite foam 1 according to the present embodiment can be obtained, for example, by extrusion-foaming the molding material of the propylene-based resin in which the fibrous filler 9 is contained. A known extrusion foaming device can be used as a production device, which heats the molding material including the propylene-based resin and the fibrous filler 9 to be melted, kneads the molding material with an appropriate shearing stress applied thereto and extrusion-foams the molding material from a tubular die. An extruder included in the production device may be either a uniaxial extruder or a biaxial extruder. As an extrusion foam-molding device, for example, an extrusion foam-molding of a tandem-type disclosed in JP-A-2004-237729 may be used, to which two extruders are connected.

Production of Second Extruded Foam:

According to the present embodiment, the extruded composite foam 1 may be formed as an assembly of bundled threads of extruded foam. The assembly of the bundled threads of extruded foam is formed, for example, such that, from an assembly of tubular dies provided by a plurality of tubular dies or an extrusion die in which a plurality of extrusion orifices are provided, a plurality of threads are extrusion-foamed to be fused and bundled together in the longitudinal direction.

In an example of the latter, an assembly of bundled threads of extruded foam may be obtained by extrusion-foaming multiple threads 22, 32 (see FIGS. 2 and 3) from extrusion dies 5, 6 in which a plurality of extrusion orifices 51, 61 (see FIG. 3) are provided and fusing and bundling together the threads 22, 32 in the longitudinal direction.

By forming the assembly of the bundled threads of the extruded foam in which extruded foam in form of the threads 22, 32 are multiply bundled together, the expansion ratio of the extruded composite foam 1 may be enhanced. Thus, the extruded composite foam 1 having a high expansion ratio and a sufficient thickness can be easily molded in various shapes.

Producing such an assembly of the bundled threads of the extruded foam is known from JP-A-53-1262, for example.

In producing at least one of the first extruded foam 2 and the second extruded foam 3, after the propylene-based resin as the molding material is extruded from the extrusion die, the extruded foam extruded from the extrusion die is vacuum-aspirated in a direction substantially perpendicular to the extruding direction, such that the fiber length direction of the fibrous fiber 9 (not shown in FIGS. 2 and 4), i.e., an orientation of the fibrous fiber 9 can be aligned along the thickness direction of the extruded propylene-based foam. With this arrangement, the extruded propylene-based resin composite foam 1 having a high energy-absorbing capability can be obtained.

Figure 13:
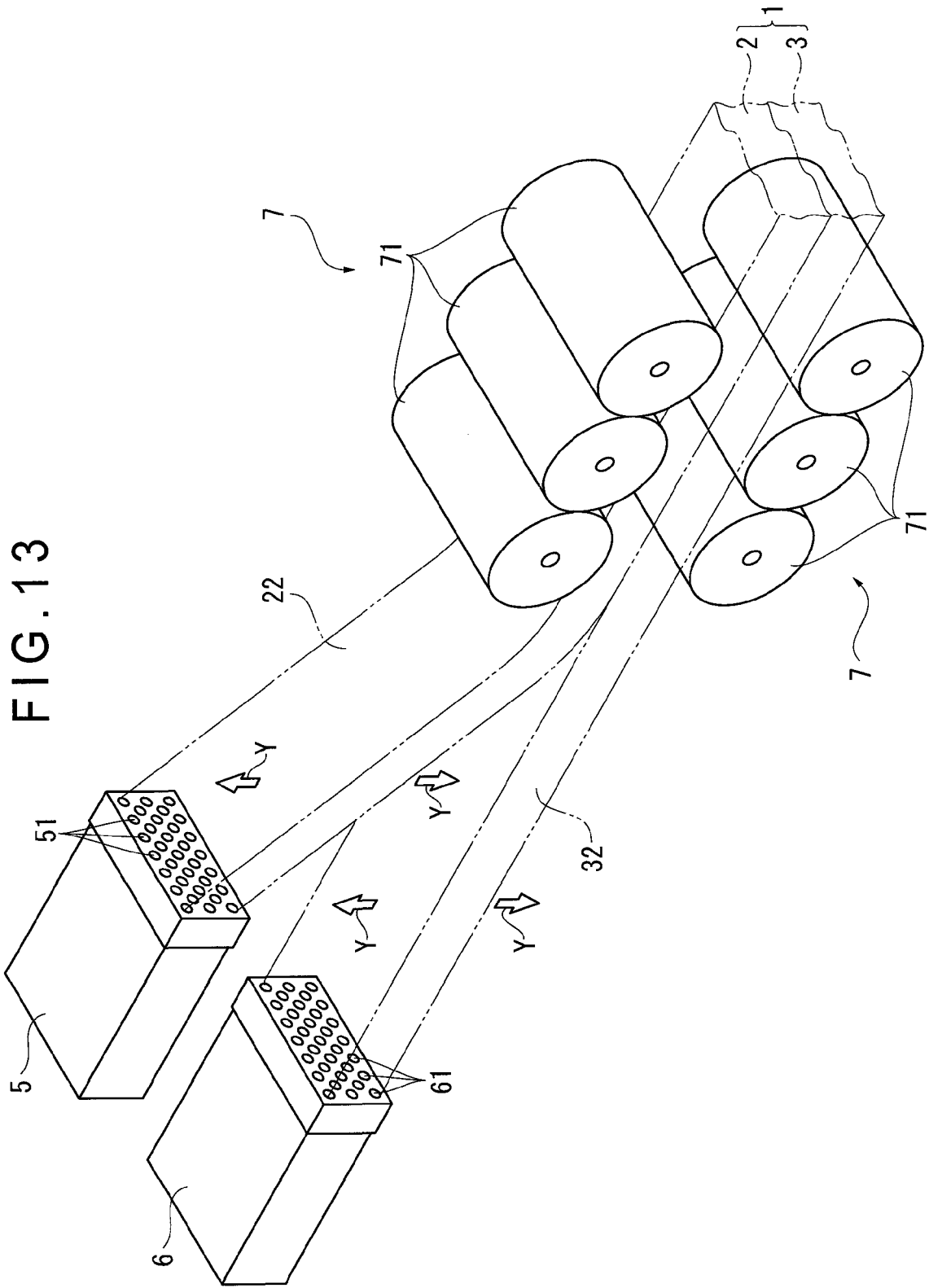
FIG. 13 is an illustration schematically showing examples of an extrusion die and a cooling sizing roller used for producing the extruded propylene-based resin composite foam according to the third embodiment.

FIG. 13 is a perspective view showing an extrusion die and a cooling sizing roller used for producing the extruded propylene-based resin composite foam. As shown in FIG. 13, the threads 22, 32 extruded from the extrusion orifices 51, 61 of the extrusion dies 5, 6 is vacuum-aspirated in the thickness direction (a direction substantially perpendicular to the extruding direction: Y direction indicated by an arrow in FIG. 13), and subsequently pressurized and cooled by the pair of cooling sizing rollers 7.

The threads 22, 32 are vacuum-aspirated by vacuum-aspiration devices (not shown) that are positioned to face each other with the threads 22, 32 interposed therebetween.

The extruded propylene-based resin composite foam 1 according to the present embodiment can have the following effects as desired in addition to the effects obtained in the first embodiment.

Specifically, the extruded propylene-based resin composite foam 1 according to the present embodiment contains the fibrous filler 9 in a content of more than 0 mass % and 60 mass % or less of the total molding material forming the foam. The fibrous filler 9 is arranged so that the direction of fiber length is aligned along the extruding direction of the extruded composite foam 1. Additionally, due to the presence of the foaming foam cells 21, 31, the fibrous filler 9 is arranged in the thickness direction. With this arrangement, a high stress arises even when a slight strain is applied in the thickness direction of the extruded composite foam 1, thereby providing the extruded composite foam having the energy-absorbing capability in addition to the above-described sound absorption performance.

According to the present embodiment, the extruded propylene-based resin composite foam 1 including the first extruded foam 2 and the second extruded foam 3 is extruded foam that is excellent in the energy-absorbing capability in addition to the insulation efficiency and the sound absorption performance. Further, by setting the expansion ratio to be 10 or more, the weight of the foam can be reduced, whereby the usability is enhanced.

The extruded composite foam 1 according to the present embodiment, which is excellent in a shock-absorbing capability (energy-absorbing capability) in addition to the insulation efficiency and the sound absorption performance, is applicable to a structural material in the fields of automobiles (interior components such as ceiling, floor, door and the like) and a structural material in the fields of construction and civil engineering (building material and the like).

Particularly, a residential structural material in the fields of construction and civil engineering is often required to have a sound absorption performance on the inner side and an insulation efficiency on the outer side. Thus, when the extruded composite foam 1 according to the present embodiment is applied to the structural material, the extruded composite foam 1 may be arranged such that the first extruded foam 2 is disposed on the inner side while the second extruded foam 3 is disposed on the outer side, whereby the effects of the extruded composite foam can be maximally exhibited. When the extruded composite foam is used in the ceiling, the door and the like of the automobile, the extruded composite foam effectively functions in absorbing a shock energy caused in an automobile collision and a sound from the outside of the automobile.

Fourth Embodiment

Extruded propylene-based resin composite foam and a producing method of the extruded propylene-based resin composite foam according to a fourth embodiment of the present invention will be described below.

Although the propylene-based resin of the present embodiment is basically identical to that of the third embodiment, an olefin-based polymer is added as in the second embodiment, so that the extruded composite foam that is particularly excellent in a vibration-suppressive performance and an energy-absorbing capability is formed.

In extruded propylene-based resin composite foam 1 according to the present embodiment, a propylene-based resin as a material for molding extruded foam includes an olefin-based polymer whose loss tangent (tan δ) is 0.04 to 100 at a temperature of 298K and a frequency of 10 Hz (a specific olefin-based polymer) in addition to the resin material of the above-described third embodiment.

In the extruded propylene-based resin composite foam 1 as arranged in the above-described manner according to the present embodiment, the olefin-based polymer, which is a viscous material, can be uniformly dispersed on the cell wall of the foam cells forming the molded foam. Thus, the foam can efficiently absorb vibrations, thereby providing the extruded foam that is excellent in the vibration suppressive performance in addition to the insulation efficiency, the sound absorption performance and the energy-absorbing capability.

<Modification of Embodiments>

In the second embodiment, the first extruded foam and the second extruded foam formed of the propylene-based resin of the first embodiment is added with the olefin-based polymer whose loss tangent (tan δ) is 0.04 to 100 at the temperature of 298K and the frequency of 10 Hz (the specific olefin-based polymer).

In the third embodiment, the first extruded foam and the second extruded foam formed of the propylene-based resin of the first embodiment is both added with the fibrous filler at the content of more than 0 mass % and 60 mass % or less.

The substances are added so that predetermined capabilities are reliably obtained: namely the vibration-suppressive performance by the olefin-based polymer; and the energy-absorbing capability by the fibrous filler.

In the fourth embodiment, the first extruded foam and the second extruded foam formed of the propylene-based resin of the first embodiment is added with the olefin-based polymer similarly to the second embodiment and the fibrous filler similarly to the third embodiment, such that both the vibration-suppressive performance and the energy-absorbing capability are obtained from the substances.

Although both the first extruded foam and the second extruded foam are similarly added with the olefin-based polymer or the fibrous filler in the embodiments, the olefin-based polymer and the fibrous filler may be added at a different proportion.

The olefin-based polymer or the fibrous filler may be added to only either of the first extruded foam or the second extruded foam.

In the third embodiment, the fibrous filler may be added to only either of the first extruded foam or the second extruded foam.

Similarly, in the fourth embodiment, the olefin-based polymer and the fibrous filler may be added to only either of the first extruded foam or the second extruded foam.

Specifically, in the second embodiment, the olefin-based polymer may be added to only either of the first extruded foam or the second extruded foam.

In the fourth embodiment, for example, the olefin-based polymer may be added only to the first extruded foam while the fibrous filler is added to the second extruded foam. Since both the olefin-based polymer and the fibrous filler are added as a whole, both the vibration-suppressive performance and the energy-absorbing capability can be obtained from the substances.

Although the extruded propylene-based resin composite foam is formed as an exemplary laminate in which both the laminated first extruded foam 2 and the laminated second extruded foam 3 are singularly layered in the above-described first, second, third and fourth embodiments and the modifications of the embodiments, the arrangement is not limited thereto. For example, the first extruded foam and the second extruded foam may be multi-layered to include two layers or more.

The first extruded foam and the second extruded foam may be arranged in plurality at random in the extruded composite foam. As long as the extruded composite foam 1 includes the first extruded foam 2 and the second extruded foam 3, the extruded composite foam 1 may be arranged as desired.

Figure 8:
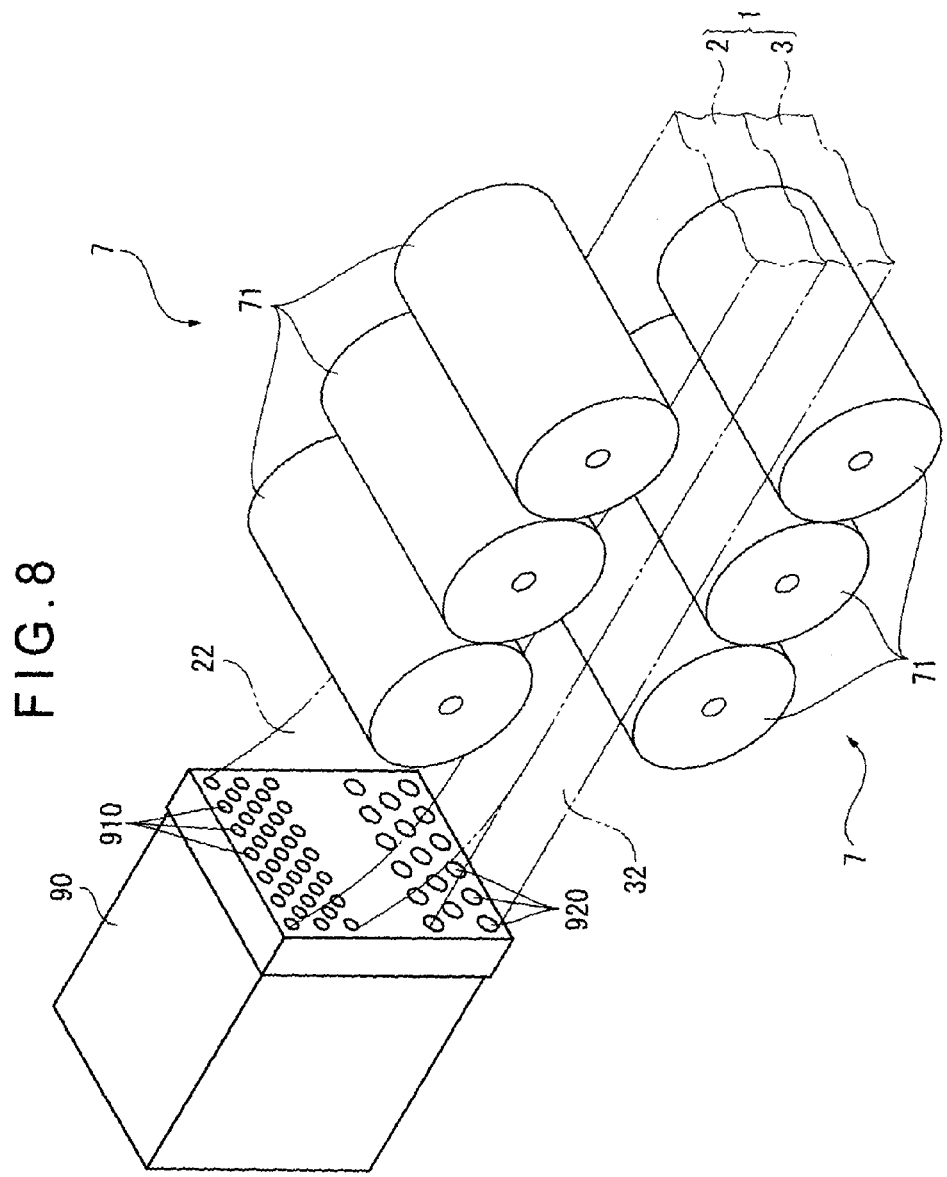
FIG. 8 is an illustration schematically showing third examples of an extrusion die and a cooling sizing roller used for producing the extruded propylene-based resin composite foam.

In addition, the plurality of extrusion dies shown in FIG. 3 are not necessarily required in order to obtain the extruded composite foam 1 shown in FIG. 2. As shown in FIG. 8, for instance, the extrusion die may be singularly provided. Here, an extrusion die 90 has two types of extrusion orifices, namely a plurality of extrusion orifices 910 and a plurality of extrusion orifices 920.

The specific arrangement, the profile and the like described in the embodiment of the present invention can be altered as long as an object of the present invention can be attained.

EXAMPLE

The present invention will more specifically be described by providing examples and production examples, while the present invention will not be limited to the content of the examples and the like.

Note that numerical values of solid properties and the like in the examples and the production examples described below were measured by the methods described below.

(1) Mass fractions of a propylene-based polymer component (Component 1) at the first stage and a propylene-based polymer component (Component 2) at the second stage:

The mass fractions were obtained from the mass balance using the flow meter integrated value of propylene continuously supplied at the time of polymerization.

(2) Intrinsic viscosity [η]:

The intrinsic viscosity [η] was measured in a tetralin solvent at 135° C. Further, the intrinsic viscosity [$\eta_2$] of Component 2 was calculated by the following expression (V):

$$[\eta_2]=([\eta_{total}]\times 100-[\eta_1]\times W_1)/W_2 \quad (V)$$

[$\eta_{total}$]: Intrinsic viscosity (dL/g) of the entire propylene-based polymer
[$\eta_1$]: Intrinsic viscosity (dL/g) of Component 1
$W_1$: Mass fraction (mass %) of Component 1
$W_2$: Mass fraction (mass %) of Component 2

(3) Melt Flow Rate (MFR):

MFR was measured based on JIS K7210 at a temperature of 230° C. and a load weight of 2.16 kgf.

(4) Melt Tension:

Capirograph 1C (manufactured by Toyo Seiki Seisakusho. Ltd.) was used and measured at a measurement temperature of 230° C. and drawing rate of 3.1 m/min. For the measurement, an orifice having a length of 8 mm and a diameter of 2.095 mm was used.

(5) Measurement of Viscoelasticity:

The viscoelasticity was measured using a device having the following specification. In addition, the storage modulus G' was obtainable from a real number part of the complex modulus.

| Device: | RMS-800 (manufactured by Rheometrics, Co., Ltd.) |
|---|---|
| Temperature: | 190° C. |
| Distortion: | 30% |
| Frequency: | 100 rad/s to 0.01 rad/s |

Production Example 1

Production of Propylene-Based Multistage Polymer (i) Preparation of Pre-Polymerization-Catalyst Component:

After a three-necked flask of 5-liter inner volume equipped with a stirrer underwent treatments of sufficient drying and nitrogen gas substitution, 4 liters of dehydrated heptane and 140 grams of diethyl aluminum chloride were added thereinto. Then, 20 grams of commercially-available Solvay titanium trichloride catalyst (manufactured by Tosoh Finechem Corporation) was added. Thereafter, propylene was continuously added into the flask while a stirring operation was being performed with the temperature maintained at 20° C. After 80 minutes, the stirring was terminated. Consequently, a pre-polymerization catalyst component was produced in which 0.8 g of propylene was polymerized per gram of titanium trichloride catalyst.

(ii) Polymerization of Propylene (First Stage)

After a stainless autoclave of 10-liter inner volume equipped with a stirrer underwent treatments of sufficient drying and nitrogen gas substitution, 6 liters of dehydrated heptane was added and the nitrogen in the system was replaced with propylene. Thereafter, propylene was added into the autoclave while a stirring operation was being performed. The inside of the system was then stabilized at an inner temperature of 60° C. and a total pressure of 0.78 MPa. Subsequently, 50 milliliters of heptane slurry was added into the autoclave, the heptane slurry containing the pre-polymerization catalyst component obtained in the above-mentioned (i) at an amount equivalent to 0.75 grams of the solid catalyst, thereby initiating a polymerization. The yield of the polymer, which was calculated from the integrated value of propylene flow when the propylene was continuously supplied for 35 minutes, was 151 grams. Sampling and analyzing of a part of the polymer proved that the intrinsic viscosity was 14.1 dL/g. After that, the inner temperature was lowered to 40° C. or less, the stirring was slowed down, and the pressure was released.

(iii) Polymerization of Propylene (Second Stage):

After the pressure is released, the inner temperature was again increased to 60° C. and propylene was added to the autoclave while 0.15 MPa of hydrogen was added thereto and a stirring operation was being performed. Continuously added at a total pressure of 0.78 MPa, the propylene had been polymerized at 60° C. for 2.8 hours. At this time, a part of the polymer was sampled and analyzed, and the intrinsic viscosity was 1.16 dL/g.

After the completion of the polymerization, 50 milliliters of methanol was added to the polymer, then the temperature was lowered and the pressure was released. The total contents were transferred to a filtering tank equipped with a filter to be added with 100 milliliters of 1-butanol, and then the contents were stirred at 85° C. for 1 hour for solid-liquid separation. Further, a solid part was washed two times with 6 liters of heptane at 85° C. and dried under vacuum, whereby 3.1 kg of a propylene-based polymer was obtained.

From the above-mentioned result, a polymerization weight ratio of the first stage to the second stage was 12.2/87.8. The intrinsic viscosity of the propylene-based polymer component generated at the second stage was calculated to be 1.08 dL/g.

Subsequently, 600 ppm of IRGANOX 1010 (manufactured by Ciba Specialty Chemicals, Co., Ltd.) as an antioxidant and 500 ppm of calcium stearate as a neutralizing agent were added to be mixed therewith in relation to 100 parts by weight of powder of the thus obtained propylene-based multistage polymer. The mixture thereof was melt-kneaded by Labo-Plastomill mono-axial extruder (manufactured by Toyo Seiki Seisaku-sho. Ltd., 20 mm in diameter) at a temperature of 230° C. to form a propylene-based pellet.

The solid state property and resin characteristics of the resultant propylene-based multistage polymer are shown in Table 1.

(Solid State Properties and Resin Characteristics of Propylene-Based Multistage Polymer)

TABLE 1

| | | Production Example 1 |
|---|---|---|
| First-stage propylene-based polymer component | Intrinsic viscosity (dL/g) | 14.1 |
| | Weight fraction (mass %) | 12.2 |
| Second-stage propylene-based polymer component | Intrinsic viscosity (dL/g) | 1.08 |
| | Weight fraction (mass %) | 87.8 |
| Propylene-based polymer (pellet form) | Intrinsic viscosity (dL/g) | 2.67 |
| | MFR(g/10 minutes) | 3.3 |
| | MT(g) | 7.6 |
| Viscoelastic properties | G' (10)/G' (1) | 2.68 |
| | G' (0.1)/G' (0.01) | 2.96 |

Example 1

Specific experiment examples based on the above-described first embodiment of the present invention will be described below.

Production of the Extruded Propylene-Based Resin Composite Foam (Assembly of Bundled Threads of Extruded Foam):

Using the propylene-based multistage polymer pellet obtained in Production Example 1 above as the molding material; using two tandem-type extrusion-foaming molding apparatuses disclosed in JP-A-2004-237729 (respectively equipped with two monoaxial extruders including a mono-axial extruder with a screw diameter of Φ 50 mm and a monoaxial extruder with a screw diameter of Φ 35 (mm)); and using an extrusion orifice assembly including multiple circular extrusion orifices (circular tube dies, all of which had substantially the same cross-sectional areas) as a die in each of the two apparatuses, the extruded propylene-based resin composite foam was produced by the following method in which the first extruded foam and the second extruded foam were laminated. The first extruded foam and the second extruded foam were produced as an assembly of the bundled threads of the extrusion-foam in a plate shape in which the multiple extrusion-foamed threads were bundled together.

Note that the foaming was performed by injecting a $CO_2$-supercritical fluid using a Φ 50-mm-diameter monoaxial extruder.

Specifically, while the molding material was being melted using the Φ 50-mm-diameter monoaxial extruder, the $CO_2$-supercritical fluid was injected. After the fluid was uniformly and sufficiently dissolved in the molten molding material, the material was extruded from the Φ 35-mm-diameter monoaxial extruder connected thereto such that a resin temperature became 180° C. (185° C. for the second extruded foam) at the die-outlet of the extruder to mold extruded foam. The threads (the first extruded foam and the second extruded foam) extruded from the two apparatuses were laminated to mold the extruded composite foam. The details of the conditions of the production are described below.

Note that as the resin temperature at the die-outlet of the Φ 35-mm-diameter-monoaxial extruder, for example, a value obtained by measurement using a thermocouple thermometer may be adopted. The resin temperature may be considered to correspond to the temperature of a foaming molten resin when extruded.

In the production of the second extruded foam, based on these conditions, the pressure gradient calculated in the formula (I) was 450 MPa/m, and the decompression rate calculated in the formula (II) was 60 MPa/s.

| (Production Conditions: First Extruded Foam) | |
|---|---|
| $CO_2$ supercritical fluid: | 7 mass % |
| Extrusion rate: | 8 kg/hr |
| Diameter of each die outlet: | 0.5 mm |
| Pressure of resin in upstream of die: | 8 MPa |
| Extrusion temperature at die outlet: | 185° C. |

| (Production Conditions: Second Extruded Foam) | |
|---|---|
| Material constant M (Pa · $s^n$): | 6000 (value at 185° C.) |
| Material constant n: | 0.4 |
| $CO_2$ supercritical fluid: | 7 mass % |
| Extrusion rate: | 8 kg/hr |
| Pressure of resin in upstream of die outlet: | 6 MPa |
| Flow rate per circular tube die at die outlet: | 100 mm$^3$/s |
| Diameter of each die outlet: | 1 mm |
| Cross-sectional area of flow path: | 0.79 mm$^2$ |
| Extrusion temperature at die outlet: | 185° C. |

The expansion ratio, the average cell diameter and the closed cell content of the first and second extruded foam in the extruded propylene-based resin composite foam obtained in accordance with Example 1 were measured under the following conditions. The results are shown in Table 2.

(Measurement Condition)

Expansion ratio: The weight of the extruded foam obtained was divided by the volume thereof defined by a submerging method to obtain a density, and the expansion ratio was then calculated.

| | |
|---|---|
| Closed cell content: | It was measured based on ASTM D2856. |
| Average cell diameter: | It was measured based on ASTM D3576-3577. |

(Measurement Results)

TABLE 2

| | First Extruded Foam | Second Extruded Foam |
|---|---|---|
| Expansion ratio (times) | 31 | 26 |
| Closed cell content (%) | 60 | 10 |
| Average cell diameter of foam cells (µm) | 110 | 250 |

Figure 6:
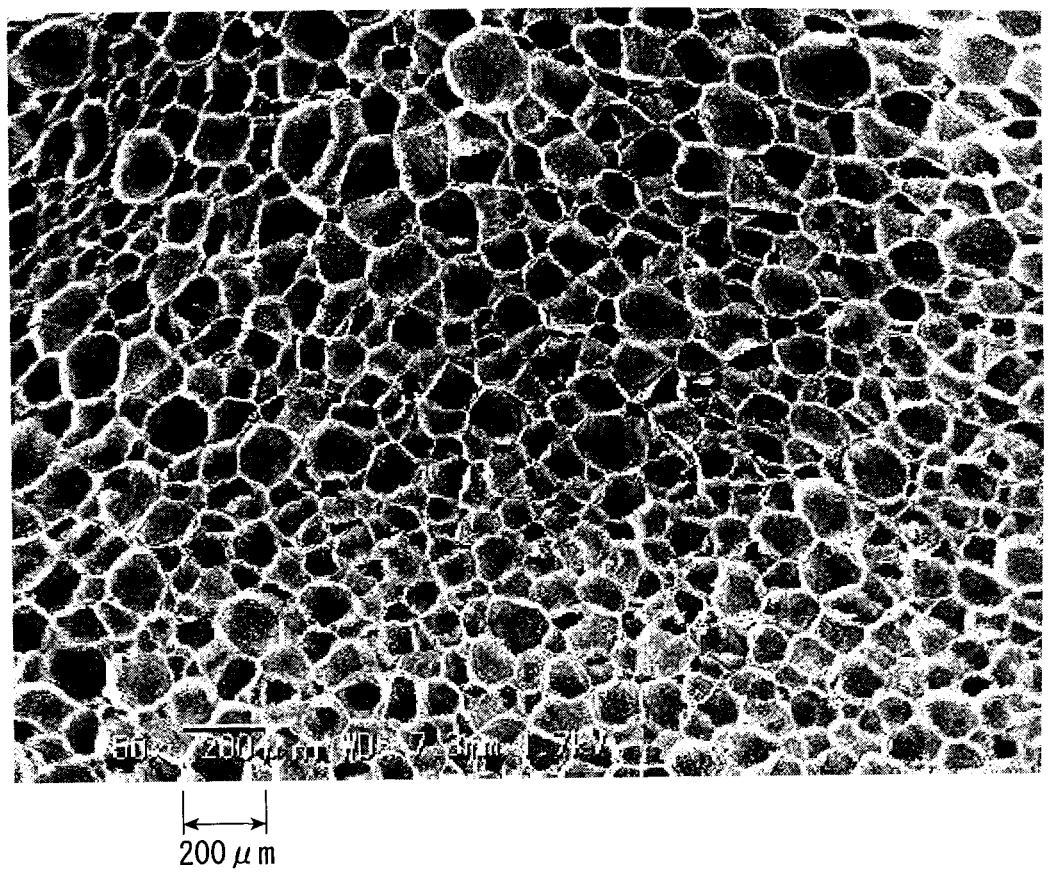
FIG. 6 is an electron microgram showing a cross-section of first extruded foam forming extruded propylene-based resin composite foam (an assembly of bundled threads of extruded foam) obtained in Example 1 (magnification: 50 times)
Figure 7:
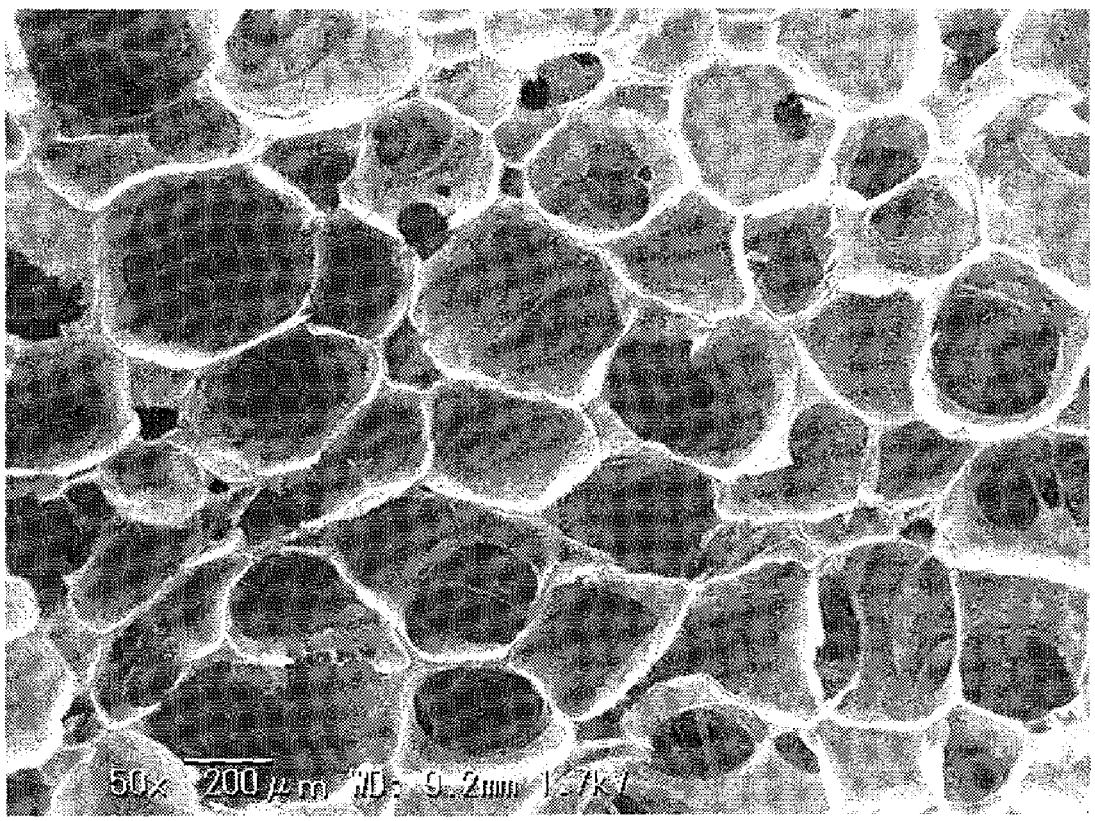
FIG. 7 is an electron microgram showing a cross-section of second extruded foam forming the extruded propylene-based resin composite foam (the assembly of bundled threads of extruded foam) obtained in Example 1 (magnification: 50 times)

FIG. 6 is an electron micrograph of the cross section of the first extruded foam of the extruded propylene-based resin composite foam obtained in Example 1 (magnification of 50)

while FIG. 7 is an electron micrograph of the cross section of the second extruded foam of the extruded propylene-based resin composite foam obtained in Example 1 (magnification of 50). According to FIG. 6, a large number of foam cells having an average cell diameter of less than 400 μm are uniformly arranged in the first extruded foam of the extruded propylene-based resin composite foam obtained in Example 1. In addition, a large number of foam cells having an average cell diameter of 0.005 to 5.0 mm are arranged to form an open-cell structure in the second extruded foam.

Further, when the insulation efficiency and the sound absorption property of the extruded propylene-based resin composite foam obtained in Examples 1 was evaluated by an ordinary method, good results were obtained.

Example 2

Specific experiment examples based on the above-described second embodiment of the present invention will be described below.

Production of the Extruded Propylene-Based Resin Composite Foam (Assembly of Bundled Threads of Extruded Foam):

The 1-butene-based copolymer (a) as disclosed in Example 1 of WO 03/070788 was mixed into the pellet-shaped propylene-based multistage polymer (b) obtained in Production Example 1 at a weight ratio (a/b) of 15/85 (85 mass % propylene-based multistage polymer and 15 mass % 1-butene-based copolymer) to form the molding material. The solid properties and resin characteristics of the 1-butene-based copolymer are shown in Table 3.

It should be noted that measurement items in Table 3 were measured such that a loss tangent (tan δ) at a temperature of 298 K and a frequency of 10 Hz was measured using a solid-viscoelasticity measurement device (DMS 6100, manufactured by Seiko Instruments Inc.). In addition, the other items were measured in accordance with the methods described in WO 03/070788.

(Solid Properties and Resin Characteristics of 1-Butene-Based Copolymer)

TABLE 3

| Items | Unit | Measurement results |
|---|---|---|
| Loss tangent (tan δ) (Note 1) | | 1.0 |
| Mesopentad fraction (mmmm) | mol % | 71.2 |
| Stereoregularity index (Note 2) | | 8 |
| Intrinsic viscosity [η] | dL/g | 0.4 |
| Weight average molecular weight ($M_w$) | | $8 \times 10^4$ |
| Molecular weight distribution ($M_w/M_n$) | | 2.0 |
| Melting point ($T_m$-D) | ° C. | 67 |
| Melt endothermic amount (ΔH) | J/g | 38 |
| Modulus of elongation | MPa | 270 |

(Note 1) Loss tangent (tan δ) at a temperature of 298 K and a frequency of 10 Hz
(Note 2) {mmmm/(mmrr + rmmr)}
Measurement methods are based on the description of WO 03/070788 except for the measurement of loss tangent.

Extrusion-foaming the molding material with the two tandem-type extrusion-foaming molding apparatuses disclosed in JP-A-2004-237729 (respectively equipped with two monoaxial extruders including a monoaxial extruder with a screw diameter of Φ 50 mm and a monoaxial extruder with a screw diameter of Φ 35 (mm)); and using an extrusion orifice assembly including multiple circular extrusion orifices (circular tube dies, all of which had substantially the same cross-sectional areas) as a die in each of the two apparatuses, the extruded propylene-based resin composite foam was produced by the following method in which the first extruded foam and the second extruded foam were laminated. The first extruded foam and the second extruded foam were produced as the assembly of the bundled threads of the extrusion-foam in a plate shape in which the multiple extrusion-foamed threads were bundled together.

Note that the foaming was performed by injecting a $CO_2$-supercritical fluid using a Φ 50-mm-diameter monoaxial extruder.

Specifically, while the molding material was being melted using the Φ 50-mm-diameter monoaxial extruder, the $CO_2$-supercritical fluid was injected. After the fluid was uniformly and sufficiently dissolved in the molten molding material, the material was extruded from the Φ 35-mm-diameter monoaxial extruder connected thereto such that a resin temperature became 180° C. (185° C. for the second extruded foam) at the die-outlet of the extruder to mold extruded foam. The threads (the first extruded foam and the second extruded foam) extruded from the two apparatuses were laminated to mold the extruded composite foam. The details of the conditions of the production are described below.

Note that as the resin temperature at the die-outlet of the Φ 35-mm-diameter-monoaxial extruder, for example, a value obtained by measurement using a thermocouple thermometer may be adopted. The resin temperature may be considered to correspond to the temperature of a foaming molten resin when extruded.

In the production of the second extruded foam, based on these conditions, the pressure gradient calculated in the formula (I) was 450 MPa/m, and the decompression rate calculated in the formula (II) was 60 MPa/s.

| (Production Conditions: First Extruded Foam) | |
|---|---|
| $CO_2$ supercritical fluid: | 7 mass % |
| Extrusion rate: | 8 kg/hr |
| Diameter of each die outlet: | 0.5 mm |
| Pressure of resin in upstream of die: | 8 MPa |
| Extrusion temperature at die outlet: | 185° C. |

| (Production Conditions: Second Extruded Foam) | |
|---|---|
| Material constant M (Pa · s$^n$): | 6000 (value at 185° C.) |
| Material constant n: | 0.4 |
| $CO_2$ supercritical fluid: | 7mass % |
| Extrusion rate: | 8 kg/hr |
| Pressure of resin in upstream of die outlet: | 8 MPa |
| Flow rate per circular tube die at die outlet: | 100 mm$^3$/s |
| Diameter of each die outlet: | 0.8 mm |
| Cross-sectional area of flow path: | 0.5 mm$^2$ |
| Extrusion temperature at die outlet: | 185° C. |

The expansion ratio, the average cell diameter and the closed cell content of the first and second extruded foam in the extruded propylene-based resin composite foam obtained in accordance with Example 2 were measured under the following conditions. The results are shown in Table 4.

(Measurement Condition)

Expansion ratio: The weight of the extruded foam obtained was divided by the volume thereof defined by a submerging method to obtain a density, and the expansion ratio was then calculated.

| | |
|---|---|
| Closed cell content: | It was measured based on ASTM D2856. |
| Average cell diameter: | It was measured based on ASTM D3576-3577. |

(Measurement Results)

TABLE 4

| | First Extruded Foam | Second Extruded Foam |
|---|---|---|
| Expansion ratio (fold) | 28 | 25 |
| Closed cell content (%) | 50 | 10 |
| Average cell diameter of foam cells (μm) | 120 | 280 |

Further, when the insulation efficiency, the sound absorption performance and the vibration-suppressive performance of the extruded propylene-based resin composite foam obtained in Examples 2 was evaluated by an ordinary method, good results were obtained.

Example 3

Specific experiment examples based on the above-described third embodiment of the present invention will be described below.

Production of the Extruded Propylene-Based Resin Composite Foam (Assembly of Bundled Threads of Extruded Foam):

The pellet-shaped propylene-based multistage polymer obtained in Production Example 1 as described above was mixed with a fibrous filler as specified below to form the molding material. The content of the fibrous filler was 10 mass % of the entire molding material.

| (Fibrous Filler) | |
|---|---|
| Material: | Glass fiber (MA 486A (trade name) manufactured by ASAHI FIBER GLASS Co., Ltd.) |
| Average fiber length: | 3 mm |
| Average fiber diameter: | 13 μm |

Extrusion-foaming the molding material with the two tandem-type extrusion-foaming molding apparatuses disclosed in JP-A-2004-237729 (respectively equipped with two monoaxial extruders including a monoaxial extruder with a screw diameter of Φ 50 mm and a monoaxial extruder with a screw diameter of Φ 35 (mm)); and using an extrusion orifice assembly including multiple circular extrusion orifices (circular tube dies, all of which had substantially the same cross-sectional areas) as a die in each of the two apparatuses, the extruded propylene-based resin composite foam was produced by the following method in which the first extruded foam and the second extruded foam were laminated. The first extruded foam and the second extruded foam were produced as the assembly of the bundled threads of the extrusion-foam in a plate shape in which the multiple extrusion-foamed threads were bundled together.

Note that the foaming was performed by injecting a $CO_2$-supercritical fluid using a Φ 50-mm-diameter monoaxial extruder.

Specifically, while the molding material was being melted using the Φ 50-mm-diameter monoaxial extruder, the $CO_2$-supercritical fluid was injected. After the fluid was uniformly and sufficiently dissolved in the molten molding material, the material was extruded from the Φ35-mm-diameter monoaxial extruder connected thereto such that a resin temperature became 180° C. (185° C. for the second extruded foam) at the die-outlet of the extruder to mold extruded foam. The threads (the first extruded foam and the second extruded foam) extruded from the two apparatuses were laminated to mold the extruded composite foam. The details of the conditions of the production are described below.

Note that as the resin temperature at the die-outlet of the Φ 35-mm-diameter-monoaxial extruder, for example, a value obtained by measurement using a thermocouple thermometer may be adopted. The resin temperature may be considered to correspond to the temperature of a foaming molten resin when extruded.

In the production of the second extruded foam, based on these conditions, the pressure gradient calculated in the formula (I) was 450 MPa/m, and the decompression rate calculated in the formula (II) was 60 MPa/s.

| (Production Conditions: First Extruded Foam) | |
|---|---|
| $CO_2$ supercritical fluid: | 7 mass % |
| Extrusion rate: | 8 kg/hr |
| Diameter of each die outlet: | 0.5 mm |
| Pressure of resin in upstream of die: | 8 MPa |
| Extrusion temperature at die outlet: | 185° C. |

| (Production Conditions: Second Extruded Foam) | |
|---|---|
| Material constant M (Pa · s$^n$): | 6000 (value at 185° C.) |
| Material constant n: | 0.4 |
| $CO_2$ supercritical fluid: | 7 mass % |
| Extrusion rate: | 8 kg/hr |
| Pressure of resin in upstream of die outlet: | 8 MPa |
| Flow rate per circular tube die at die outlet: | 100 mm$^3$/s |
| Diameter of each die outlet: | 0.8 mm |
| Cross-sectional area of flow path: | 0.5 mm$^2$ |
| Extrusion temperature at die outlet: | 185° C. |

The expansion ratio, the average cell diameter and the closed cell content of the first and second extruded foam in the extruded propylene-based resin composite foam obtained in accordance with Example 3 were measured under the following conditions. The results are shown in Table 5.

(Measurement Condition)

Expansion ratio: The weight of the extruded foam obtained was divided by the volume thereof defined by a submerging method to obtain a density, and the expansion ratio was then calculated.

| | |
|---|---|
| Closed cell content: | It was measured based on ASTM D2856. |
| Average cell diameter: | It was measured based on ASTM D3576-3577. |

(Measurement Results)

TABLE 5

| | First Extruded Foam | Second Extruded Foam |
|---|---|---|
| Expansion ratio (times) | 25 | 21 |
| Closed cell content (%) | 45 | 8 |
| Average cell diameter of foam cells (μm) | 200 | 300 |

The energy-absorbing capability and the fibrous filler orientation of the extruded propylene-based resin foam obtained in Example 3 were measured in the following conditions.

(Measurement of Energy-Absorbing Capability)

A compression examination was conducted with a compression examination machine (TENSILON/CTM-I-5000 (trade name) manufactured by BALDWIN TECHNOLOGY COMPANY, INC.) at a temperature of 300 K at a compression strain rate of $1.0 \times 10^{-2}$/s.

(Measurement of Fibrous Filler Orientation)

The extruded propylene-based resin composite foam was cut in a direction orthogonal to the thickness direction, and an orientation angle was evaluated based on a long diameter and a short diameter of an elliptical cross-section of the fiber in a cross-section of the extruded propylene-based resin composite foam. When the orientation angle was 45 degree or less, the fibrous fiber was regarded as being oriented in the thickness direction of the extruded propylene-based resin composite foam. An evaluation was performed on a proportion of the number of the fibers that were oriented in the thickness direction to the total number of the fibers in the cross-section of the extruded propylene-based resin composite foam.

In both the first and second extruded foam of the extruded propylene-based resin composite foam obtained in Example 3, 25 percent of the total number of the fibrous fillers were observed to be oriented in the thickness direction of the extruded propylene-based resin foam.

In addition, a high energy-absorbing capability was observed according to the result of the measurement of the energy-absorbing capability. The extruded propylene-based resin composite foam obtained in Example 3, in which a small strain generated a large stress, was observed to be excellent in the energy-absorbing capability.

Further, in order to check an improvement of the energy-absorbing capability due to an addition of the fibrous filler, the fibrous filler (basic magnesium sulfate whisker) was added to the propylene-based multistage polymer shown in the above-described Production Example 1 in an amount of 10 mass %. An evaluation was performed on a relationship between a compression strain and a generated stress in the foam.

As a result, the generated stress corresponding to the compression stress of 25 percent is shown below in Table 6, whereby the addition of the fibrous filler has been found to improve the energy-absorbing capability.

TABLE 6

|  | Expansion ratio (times) | 25% Strain-Generated Stress (Pa) |
|---|---|---|
| No addition of fibrous filler to extruded propylene-based resin composite foam | 29.8 | 58000 |
| 10 mass % addition of fibrous filler to extruded propylene-based resin composite foam | 33.5 | 79000 |

Further, when the insulation efficiency and the sound absorption performance of the extruded propylene-based resin composite foam obtained in Examples 3 were evaluated by an ordinary method, good results were obtained.

Based on the above, the extruded propylene-based resin composite foam according to the present invention has been found to be excellent in an insulation efficiency, a sound absorption performance and an energy-absorbing capability.

Example 4

Specific experiment examples based on the above-described fourth embodiment of the present invention will be described below.

To the molding material including the propylene-based multistage polymer (b) obtained in Example 3, the 1-butene-based copolymer as disclosed in Example 1 of WO 03/070788 was added. The 1-butene-based copolymer (a) as disclosed in Example 1 of WO 03/070788 was mixed into the propylene-based multistage polymer (b) at a weight ratio (a/b) of 15/85 (85 mass % propylene-based multistage polymer and 15 mass % 1-butene-based copolymer) to form the molding material. The solid properties and resin characteristics of the 1-butene-based copolymer are shown in Table 7.

It should be noted that measurement items in Table 7 were measured such that a loss tangent (tan δ) at a temperature of 298 K and a frequency of 10 Hz was measured using a solid-viscoelasticity measurement device (DMS 6100, manufactured by Seiko Instruments Inc.). In addition, the other items were measured in accordance with the methods described in WO 03/070788. The other conditions were the same as in Example 3.

(Solid Properties and Resin Characteristics of 1-butene-Based Copolymer)

TABLE 7

| Items | Unit | Measurement results |
|---|---|---|
| Loss tangent (tan δ) (Note 1) |  | 1.0 |
| Mesopentad fraction (mmmm) | mol % | 71.2 |
| Stereoregularity index (Note 2) |  | 8 |
| Intrinsic viscosity [η] | dL/g | 0.4 |
| Weight average molecular weight ($M_w$) |  | $8 \times 10^4$ |
| Molecular weight distribution ($M_w/M_n$) |  | 2.0 |
| Melting point ($T_m$-D) | ° C. | 67 |
| Melt endothermic amount (ΔH) | J/g | 38 |
| Modulus of elongation | MPa | 270 |

(Note 1) Loss tangent (tan δ) at a temperature of 298 K and a frequency of 10 Hz
(Note 2) {mmmm/(mmrr + rmmr)}
Measurement methods are based on the description of WO 03/070788 except for the measurement of loss tangent.

The expansion ratio, the average cell diameter and the closed cell content of the first and second extruded foam in the extruded propylene-based resin composite foam thus obtained were measured under the same conditions as in Example 3. The results are shown in Table 8.

(Measurement Results)

TABLE 8

|  | First Extruded Foam | Second Extruded Foam |
|---|---|---|
| Expansion ratio (times) | 22 | 17 |
| Closed cell content (%) | 42 | 6 |
| Average cell diameter of foam cells (μm) | 250 | 500 |

When the fibrous filler orientation and the energy capability were measured in the same evaluation method as in Example 3, 24 percent of the total number of the fibrous fillers were observed to be oriented in the thickness direction of the extruded propylene-based resin foam in both the first and second extruded foam. The energy-absorbing capability of the extruded propylene-based resin foam was high.

Further, when the insulation efficiency, the sound absorption performance and the vibration-suppressive performance of the extruded propylene-based resin composite foam obtained in Examples 4 were evaluated by an ordinary method, good results were obtained.

Based on the above, the extruded propylene-based resin composite foam according to the present invention has been found to be excellent in an insulation efficiency, a sound absorption performance, a vibration-suppressive performance and an energy-absorbing capability.

INDUSTRIAL APPLICABILITY

The extruded propylene-based resin foam according to the present invention, which is excellent in a vibration-suppressive performance and an energy-absorbing capability in addition to an insulation efficiency and a sound absorption performance, can be advantageously applied to structural materials (for instance, a construction material and an interior component such as a ceiling of an automobile, a floor and a door) that require a sound absorption property in the fields of, for example, building construction, civil engineering and the fields of automobiles.

What is claimed is:

1. An extruded propylene-based resin composite foam formed by extrusion-foaming a molding material comprising a propylene-based resin, comprising:
    a first extruded foam having a closed cell content of 40 percent or more and an expansion ratio of 10 or more; and
    a second extruded foam having a closed cell content of less than 40 percent and an expansion ratio of 10 or more,
    wherein a propylene-based multistage polymer comprising the following first constituent (A) and second constituent (B) is used as the propylene-based resin to form at least one of the first extruded foam and the second extruded foam:
    (A) the first constituent containing a propylene homopolymer component or a copolymer component of propylene and α-olefin having carbon number of 2 to 8, each having an intrinsic viscosity [η] of more than 10 dL/g, which is measured in a tetralin solvent at 135° C., the first constituent occupying 5 to 20 mass % of the propylene-based multistage polymer; and
    (B) the second constituent containing a propylene homopolymer component or a copolymer component of propylene and α-olefin having carbon number of 2 to 8, each having an intrinsic viscosity [η] of 0.5 to 3.0 dL/g, which is measured in a tetralin solvent at 135° C., the second constituent occupying 80 to 95 mass% of the propylene-based multistage polymer.

2. The extruded propylene-based resin composite foam according to claim 1, wherein the extruded propylene-based resin composite foam is a laminate in which the first extruded foam and the second extruded foam are laminated in a thickness direction of the extruded composite foam.

3. The extruded propylene-based resin composite foam according to claim 1, wherein the closed cell content of the first extruded foam is 60 percent or more.

4. The extruded propylene-based resin composite foam according to claim 1, wherein an average diameter of foam cells forming the first extruded foam is 500 μm or less.

5. The extruded propylene-based resin composite foam according to claim 4, wherein the average diameter of the foam cells forming the first extruded foam is 200 μm or less.

6. The extruded propylene-based resin composite foam according to claim 1, wherein an average diameter of foam cells forming the second extruded foam is in a range of 0.005 to 5.0 mm.

7. The extruded propylene-based resin composite foam according to claim 1, wherein a relationship between a melt flow rate (MFR) at 230° C. and a melt tension (MT) at 230° C. of the propylene-based multistage polymer satisfies the following expression (III):

$$\log(MT) > -1.33 \log(MFR) + 1.2 \qquad (III).$$

8. The extruded propylene-based resin composite foam according to claim 1, wherein the first extruded foam and the second extruded foam is an assembly of bundled threads of extruded foam, in which a plurality of extrusion-foamed threads are bundled.

9. The extruded propylene-based resin composite foam according to claim 8, wherein the second extruded foam includes a portion in which none of the threads is present.

10. The extruded propylene-based resin composite foam according to claim 8, wherein at least a part of a surface of the second extruded foam communicates with an outside air.

11. The extruded propylene-based resin composite foam according to claim 1, wherein in at least one of the first extruded foam and the second extruded foam, the propylene-based resin forming the extruded foam contains an olefin-based polymer whose loss tangent (tan δ) is 0.04 to 100 at a temperature of 298 K and a frequency of 10 Hz.

12. The extruded propylene-based resin composite foam according to claim 11, wherein a weight ratio (a/b) of the olefin-based polymer (a) to the propylene-based resin (b) is in a range of 1/100 to 80/100.

13. The extruded propylene-based resin composite foam according to claim 11, wherein the olefin-based polymer is a 1-butene-based polymer satisfying the following conditions (1), (2), and (3):
    (1) an intrinsic viscosity [η] measured in a tetralin solvent at 135° C. is in a range of 0.01 to 0.5 dL/g;
    (2) the polymer is a crystalline resin whose melting point $(T_m\text{-D})$ is 0 to 100° C., the melting point being defined as the top of peak observed using a differential scanning calorimeter (DSC) at a highest temperature side of a melting endothermic curve, the melting endothermic curve being obtained by heating up at a rate of 10° C./min after keeping a sample at −10° C. under nitrogen atmosphere for 5 minutes; and
    (3) a stereoregularity index {(mmmm)/(mmrr+rmmr)} of the polymer is 30 or less.

14. The extruded propylene-based resin composite foam according to claim 11, wherein the olefin-based polymer is a 1-butene-based polymer satisfying the following conditions (1'), (2), and (3'):
    (1') an intrinsic viscosity [η] of the polymer measured in a tetralin solvent at 135° C. is 0.25 to 0.5 dL/g;
    (2) the polymer is a crystalline resin whose melting point $(T_m\text{-D})$ is 0 to 100° C., the melting point being defined as the top of peak observed using a differential scanning calorimeter (DSC) at a highest temperature side of a melting endothermic curve, the melting endothermic curve being obtained by heating up at a rate of 10° C./min after keeping a sample at −10° C. under nitrogen atmosphere for 5 minutes; and
    (3') a mesopentad fraction (mmmm) of the polymer obtained from a $^{13}$C-nuclear magnetic resonance (NMR) spectrum is 73 percent or less.

15. The extruded propylene-based resin composite foam according to claim 1, wherein at least one of the first extruded foam and the second extruded foam contains a fibrous filler at an amount of more than 0 mass percent and 60 mass percent or less of an entirety of the extruded foam.

16. The extruded propylene-based resin composite foam according to claim 15, wherein 20 percent or more of total fibers of the fibrous filler are oriented in a thickness direction that is substantially perpendicular to an extruding direction of the extruded propylene-based resin composite foam.

17. The extruded propylene-based resin composite foam according to claim 1, wherein the intrinsic viscosity [η] of the first constituent (A) is in a range of from 12 to 20 dL/g.

18. The extruded propylene-based resin composite foam according to claim 1, wherein the intrinsic viscosity [η] of the first constituent (A) is in a range of from 13 to 18 dL/g.

19. The extruded propylene-based resin composite foam according to claim 18, wherein the first constituent (A) occupies 8 to 18 mass % of the propylene-based multistage polymer, and the second constituent (B) occupies 82 to 92 mass % of the propylene-based multistage polymer.

\* \* \* \* \*